(12) United States Patent  (10) Patent No.: US 11,019,150 B2
Yi et al.  (45) Date of Patent: May 25, 2021

(54) INTERNET-OF-THING GATEWAY AND RELATED METHODS AND APPARATUSES

(71) Applicant: Intel Corporation, Santa Clara, CA (US)

(72) Inventors: Zhaohua Yi, Hillsboro, OR (US); Vijay Sarathi Kesavan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 15/710,512

(22) Filed: Sep. 20, 2017

(65) Prior Publication Data

US 2019/0089787 A1  Mar. 21, 2019

(51) Int. Cl.
*H04L 29/08* (2006.01)
*H04L 12/66* (2006.01)
*H04W 4/70* (2018.01)

(52) U.S. Cl.
CPC ........... *H04L 67/125* (2013.01); *H04L 12/66* (2013.01); *H04L 67/12* (2013.01); *H04W 4/70* (2018.02)

(58) Field of Classification Search
CPC ......... H04L 67/125; H04L 12/66; H04W 4/70
See application file for complete search history.

(56) References Cited

U.S. PATENT DOCUMENTS

| 7,970,215 | B2* | 6/2011 | Haque | ..................... | H03M 7/42 |
| | | | | | 382/232 |
| 9,473,514 | B1* | 10/2016 | Chou | ..................... | H04L 67/12 |
| 2009/0258630 | A1* | 10/2009 | Purohit | ..................... | H04W 4/24 |
| | | | | | 455/406 |
| 2013/0262486 | A1* | 10/2013 | O'Dell | ..................... | G06F 16/30 |
| | | | | | 707/755 |
| 2014/0244833 | A1* | 8/2014 | Sharma | .................. | H04L 12/281 |
| | | | | | 709/224 |

(Continued)

FOREIGN PATENT DOCUMENTS

CN  103761860 B  6/2016

OTHER PUBLICATIONS

Extended European Search Report dated Feb. 4, 2019 for European Patent Application No. 18189209.2, 7 pages.

*Primary Examiner* — Rupal Dharia
*Assistant Examiner* — Adam A Cooney
(74) *Attorney, Agent, or Firm* — Schwabe, Williamson & Wyatt, P.C.

(57) ABSTRACT

Apparatuses, methods and storage media associated with an IoT gateway are disclosed herein. In embodiments, an apparatus (such as an IoT gateway) for communicatively coupling a plurality of Internet-of-Things (IoT) devices of an IoT network to each other, and to an enterprise or public network, may comprise: first networking circuitry to communicatively couple the apparatus with the plurality of the IoT (smart) devices of the IoT network; second networking circuitry to communicatively couple the apparatus with the enterprise or public network; routing circuitry coupled to the first and second networking circuitries; and code table building circuitry coupled with the first and second networking circuitries to dynamically provide a code table to the IoT (smart) devices to use to exchange messages with each other, or with other devices on the enterprise or public network, based at least in part on words in the messages exchanged.

22 Claims, 14 Drawing Sheets

(56) References Cited

U.S. PATENT DOCUMENTS

| | | |
|---|---|---|
| 2015/0063368 A1* | 3/2015 | Sharma ................ H04L 1/0075 370/412 |
| 2016/0182669 A1 | 6/2016 | Xu et al. |
| 2016/0198536 A1 | 7/2016 | Britt et al. |
| 2017/0126569 A1 | 5/2017 | Seed et al. |
| 2017/0155710 A1* | 6/2017 | Quinn .................... H04L 67/10 |
| 2017/0171143 A1 | 6/2017 | Ge et al. |
| 2018/0270310 A1* | 9/2018 | Venkatesan ......... H04L 12/2836 |

* cited by examiner

| id_variable_name | parameters | parameters | parameters | code |
|---|---|---|---|---|
| target_temperature_f | [dev1] | [dev6,dev7] | 12 | 1 |
| target_temperature_high_f | [dev1] | [dev6,dev7] | 12 | 2 |
| target_temperature_low_f | [dev1] | [dev6,dev7] | 12 | 3 |
| light_value_red | [dev3,dev5] | [dev6,dev7] | 30 | 4 |
| light_value_green | [dev3,dev5] | [dev6,dev1] | 30 | 5 |
| light_value_blue | [dev3,dev5] | [dev6,dev1,dev2] | 30 | 6 |
| august_api_key | [dev5,dev5] | [dev2] | 2 | 0 |

Figure 3

INTERNET-OF-THING GATEWAY AND RELATED METHODS AND APPARATUSES

TECHNICAL FIELD

The present disclosure relates to the field of infrastructure technology, in particular, to apparatuses, methods and storage media associated with Internet-of-Thing (IoT) Networking.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In an IoT network, the gateway device plays a relatively important role. It not only interconnects IoT devices (also referred to as smart devices) of the IoT network, but also bridges these IoT (smart) devices to private enterprise or public networks (e.g., the Internet). The smart devices can "talk" with each other is one of key features of IoT. Nowadays, the popular way of smart devices talking with each other is these devices communicate through Extensible Markup Language (XML) or JavaScript Object Notation (JSON) messages that are composed of semantic English words. For example, if one device wants to update the target temperate of nest thermostat, a well-known smart device, one JSON message would be sent to the nest thermostat. The JSON message may contain: {"target_temperature_f":60, "target_temperature_high_f":75, "target_temperature_low_f":49}

Since the communication messages (XML or JSON etc) contain semantic words, and these words are usually human readable, e.g., "target_temperature_f," and some of these words are very long, which cause substantial network bandwidth and/or power consumption, when numerous messages with these long words are exchanged. Further, the words in the messages tend to be very specific to products, and vary from network to network. For example, in one IOT network, there is a Nest thermostat, but in another IOT network, there is no such device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 illustrates an example code table, in accordance with various embodiments.

DETAILED DESCRIPTION

Figure 1:
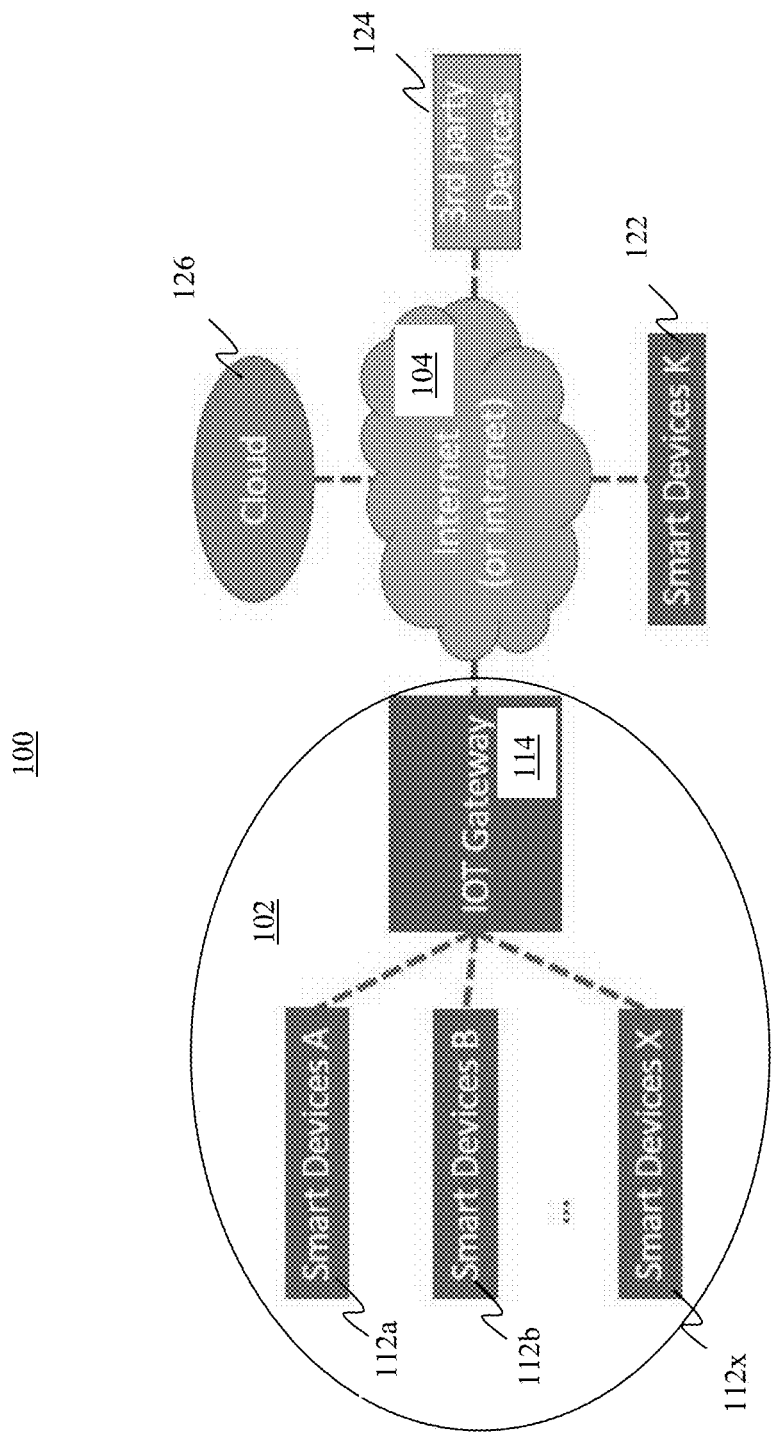
FIG. 1 illustrates an overview of an example computing/communication environment having an IoT network with an IoT gateway and a number of IoT (smart) devices, in accordance with various embodiments.

Apparatuses, methods and storage media associated with an IoT gateway are disclosed herein. In embodiments, an apparatus (such as an IoT gateway) for communicatively coupling a plurality of Internet-of-Things (IoT) (smart) devices of an IoT network to each other, and to an enterprise or public network, may comprise: first networking circuitry to communicatively couple the apparatus with the plurality of the IoT (smart) devices of the IoT network; second networking circuitry to communicatively couple the apparatus with the enterprise or public network; routing circuitry coupled to the first and second networking circuitries; and code table building circuitry coupled with the first and second networking circuitries to provide a code table to the IoT (smart) devices to use to exchange messages with each other, or with other devices on the enterprise or public network, based at least in part on words in the messages exchanged.

In embodiments, an apparatus (such as a cloud server) for supporting an Internet-of-Things (IoT) gateway of an IoT network to communicatively couple a plurality of IoT (smart) devices of the IoT network to each other, and to an enterprise or public network, may comprise: networking circuitry to communicatively couple the apparatus with the IoT gateway, and to receive long words detected in messages exchanged among the IoT (smart) devices, or messages exchanged between the IoT (smart) devices and other devices of the enterprise or public network, wherein the long words have word lengths in excess of a word length threshold; and code table building circuitry coupled with the networking circuitries to dynamically assign codes to at least some of the long words, and build and provide a code table with coding entries that map the at least some long words to the assigned codes to the IoT (smart) devices, via the IoT gateway, to use to exchange messages with each other, or with other devices on the enterprise or public network.

These and other aspects of the disclosure will be described below with references to the drawings. In the description to follow, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a programmable combinational logic circuit (e.g., field programmable gate arrays (FPGA)), a processor (shared, dedicated, or group) and/or memory (shared, dedicated, or group) that execute one or more software or firmware programs generated from a plurality of programming instructions and/or other suitable components that provide the described functionality.

The term "Internet of Things" as used herein refers to the interconnection via the Internet of computing devices/components embedded in everyday objects, enabling the everyday objects to send and receive data. The term "Fog computing" or "Fog networking," as used herein refers to a computing environment or arrangement that uses one or more collaborative end-user clients or near-user edge devices to carry out a substantial amount of storage (rather than stored primarily in cloud data centers), communication (rather than routed over the Internet backbone), and/or control, configuration, measurement and management (rather than controlled primarily by network gateways).

Referring now FIG. 1, wherein an overview of an example computing/communication environment having an IoT network with an IoT gateway and a number of IoT (smart) devices, in accordance with various embodiments, is shown. As illustrated, example computing/communication environment 100 may comprise IoT network 102 having a number of IoT (smart) devices 112a-112x (also referred to as smart devices) communicatively coupled with IoT gateway 104. In addition to interconnecting IoT (smart) devices 112a-112x to each other, IoT gateway 104 also communicatively couples IoT (smart) devices 112a-112x to an enterprise network (e.g., a Fog network or an intranet of the enterprise) or a public network (such as the Internet) 104, and through which, to other IoT (smart) devices 122, other third party devices 124 and cloud computing environment 126 (hereinafter, simply "cloud") having a number of cloud servers (not shown). As will be described in more detail below, in addition to the conventional functions of routing data/message traffics among IoT (smart) devices 112a-112x, and between IoT (smart) devices 112a-112x and enterprise/public network 104, IoT gateway 104 also dynamically builds and provides a code table for IoT (smart) devices 112a-112x to encode messages, to reduce the amount of bandwidth required to exchange messages between IoT (smart) devices 112a-112x, and with enterprise/public network 104. In embodiments, IoT gateway 104 may dynamically build and provide the code table for IoT (smart) devices 112a-112x, with the assistance of one or more cloud servers of cloud 126.

Before proceeding to further describing the dynamic code table building and provision technology of the disclosure, it should be noted that while for ease of understanding, only one IoT network 102 is shown, the present disclosure is not so limited. The present disclosure may be practiced with computing/communication environment 100 having multiple IoT networks 102, each having a number of IoT (smart) devices. Similarly, there may be any number IoT (smart) devices 122 and/or third party devices 124 on the enterprise/public network 104, as well as any number of cloud servers in cloud 126.

Figure 2:
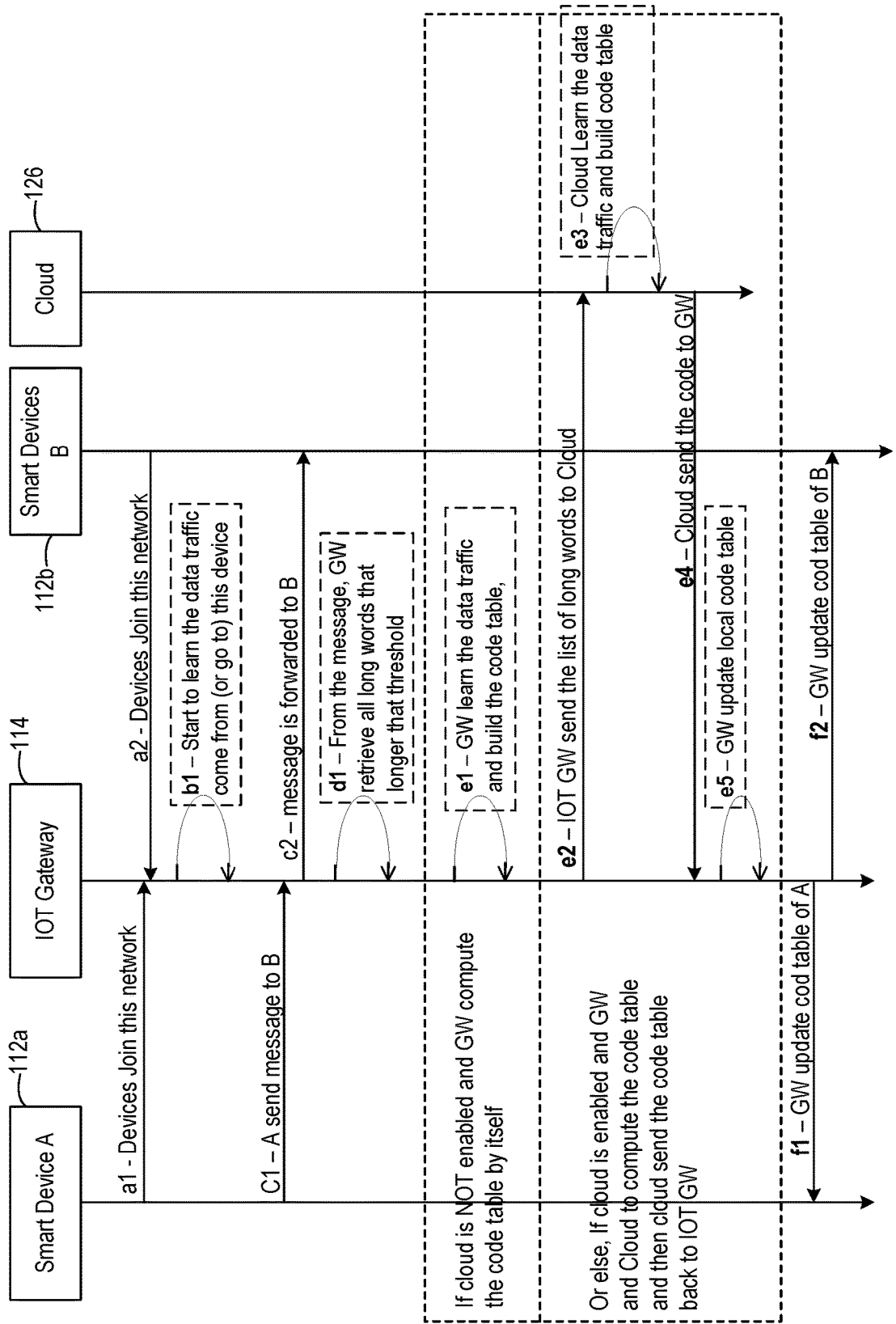
FIG. 2 illustrates an example operational flow for the IoT gateway of the IoT network to dynamically build and provide a code table for the IoT (smart) devices of the IoT network, in accordance with various embodiments.

Referring now FIG. 2, wherein an example operational flow for the IoT gateway of an IoT network to dynamically build and provide a code table for the IoT (smart) devices of the IoT network, in accordance with various embodiments, is shown. As illustrated, example operational flow 200 for an IoT gateway 114 of an IoT network to dynamically build and provide a code table for the IoT (smart) devices 112a-112x of the IoT network may include operations a1-a2, b1, c1-c2, d1, e1 or e2-e5, and f1-f2. The operations may be performed by IoT (smart) devices 112a-112b, IoT gateway 114, and optionally a cloud server of cloud 126.

Process 200 may start with operations a1-a2, where IoT (smart) devices 112a-112b may join the IoT network 102. On joining IoT network 102, IoT gateway 114 may start monitoring data/message traffics to and from IoT (smart) devices 112a-112b. At operations c1-c2, IoT (smart) device 112a may send one or more conventional messages to IoT (smart) device 112b. At operation d1, IoT gateway 114 may detect and extract all long words with word lengths in excess of a word length threshold from the data/message traffics. In embodiments, the extracted/detected long words may be saved into a list, along with identification information of a receiver or a transmitter of the IoT (smart) device 112a/112b associated with the message/long word. In embodiments, the word length threshold may be configurable, and varies across different IoT networks.

For some embodiments, process 200 may proceed to operation e1, wherein IoT gateway 114 may dynamically build the code table with code entries that map the long words to codes to be used in future data/message traffics, to reduce network bandwidth requirements. In embodiments, operation e1 may further include IoT gateway 114 tracking the frequency of encounter/usage of these long words. For these embodiments, IoT gateway 114 may assign codes to long words with usage/encounter frequencies in excess of a frequency threshold, to be used in future data/message traffic. In some alternate embodiments, process 200 may proceed to operations e2-e5 instead, wherein IoT gateway 114 at operation e2, may send the list of long words to a cloud server of cloud 126. At operation e3, the cloud server may dynamically build the code table with code entries that map the long words to codes to be used in future data/ message traffics, to reduce network bandwidth requirements. In embodiments, operation e3 may further include the cloud server tracking the frequency of encounter/usage of these long word, and dynamic build a code table with code entries that map the long words with usage/encounter frequencies in excess of a frequency threshold, to codes to be used in future data/message traffic, to reduce network bandwidth requirements. At operation e4, the cloud server may provide the code table to IoT gateway 114. At operation e5, IoT gateway 114 may update its local code table, based on the newly received code table from the cloud server.

At operations f1-f2, whether continued from operation e1 or from e5, IoT gateway of an IoT network 114 may send the code table to IoT (smart) devices 112a-112b of the IoT network to update their respective code tables. For future data/message traffics, IoT (smart) devices 112a-112b of the IoT network would use the codes in the code table custom build for the IoT network, to encode/decode data/message traffics, to reduce bandwidth requirements.

Before proceeding to further describing the dynamic code table building and provision technology of the disclosure, it should be noted that while for ease of understanding, process 200 has been described with two example IoT (smart) devices 112a-112b in the IoT network, the disclosure is not so limited. Process 200 may be practiced with any number of IoT (smart) devices 112a-112x in the IoT network, subject only to the capacity of IoT gateway 114 or the cloud server, and the bandwidth of the communication channels of IoT network 102 and/or enterprise/public network 104.

Referring now to FIG. 3, wherein an example code table dynamically built for an IoT network, in accordance with various embodiments, is shown. As illustrated, for the embodiments, example code table 300 dynamically built for an IoT network may include columns 302-310. Column 302 may be configured to store the long words detected/extracted from the data/message traffics. Columns 304-306 may be configured to store respectively the receiver and transmitter devices. Column 308 may be configured to store the encounter/usage frequencies of the long words. Column 310 may be configured to store the codes to be used to encode the corresponding long words for future data/message traffics.

Figure 4:
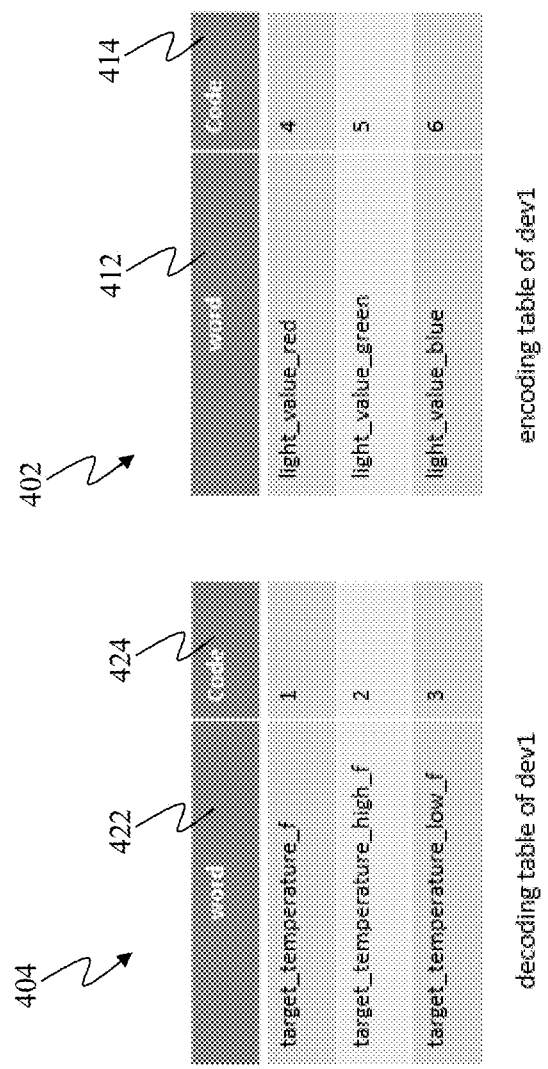
FIG. 4 illustrates example coding and decoding tables in an IoT (smart) device, in accordance with various embodiments.

Referring now to FIG. 4, wherein example coding and decoding tables in an IoT (smart) device of an IoT network, in accordance with various embodiments, are shown. As illustrated, for the embodiments, example encoding table 402 in an IoT (smart) device of an IoT network may include columns 412-414. Column 412 may store the long words detected/extracted from messages to and from the IoT (smart) devices of the IoT network, whereas column 414 may store the codes. Similarly, example decoding table 404 may likewise include columns 422-424. Column 422 may store the long words, whereas column 424 may store the codes.

Figure 5:
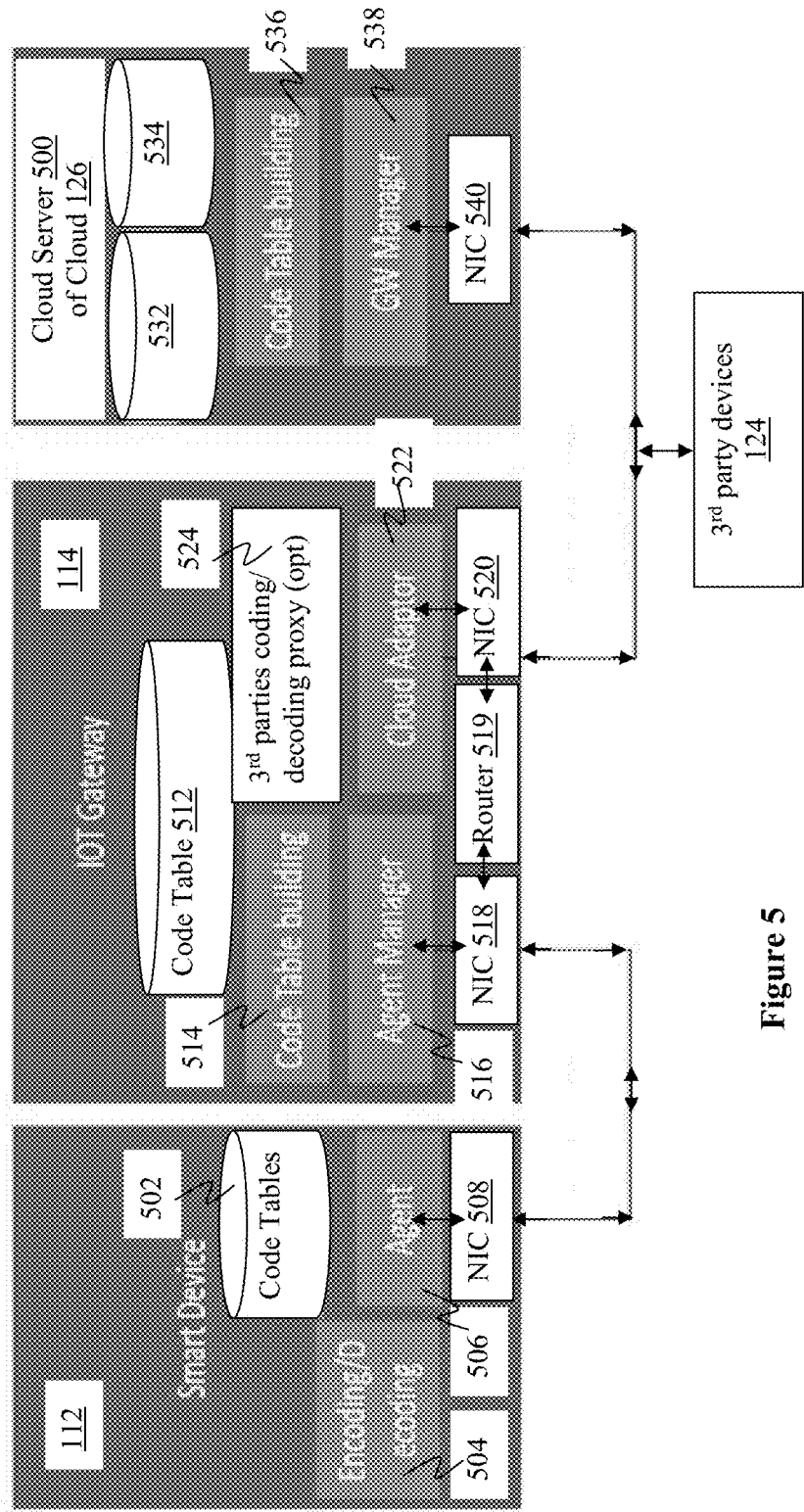
FIG. 5 illustrate a component view of an IoT (smart) device, an IoT gateway, and a Cloud server, in accordance with various embodiments.

Referring now to FIG. 5, wherein a component view of an IoT (smart) device, an IoT gateway, and a Cloud server, in accordance with various embodiments, are shown. As illustrated, IoT gateway 114 may include storage circuitry 512 configured to store the dynamically build code, and code table building circuitry 514 configured to dynamically build the code table as earlier described (and in more detail later, with reference to FIG. 6). Additionally, IoT gateway 114 may include network interface circuitries (NIC) 518 and 520 coupled with code table building circuitry 514 to communicatively couple IoT gateway 114 with IoT (smart) devices 112a-112x and cloud servers of cloud 126. Further, IoT gateway 114 may include router circuitry 519 coupled with NIC 518 and 520 to route data/message traffics between NICs 518 and 520. In embodiments, NIC 520 may also be configured to communicatively couple IoT gateway 104 to third party devices 124 that are not configured to accept the code table built by IoT gateway 114, and use the codes in the code table to encode future data/message traffics to reduce bandwidth requirements.

In embodiments, IoT gateway 114 may further include agent manager circuitry 516 and cloud adaptor circuitry 522 coupled with code table building circuitry 514 and NICs 518-520 to respectively manage the interactions with IoT (smart) devices 112a-112x and cloud servers of cloud 126. In still other embodiments, IoT gateway 114 may further include optional third party coding/decoding proxy circuitry 524 configured to serve as encoding and decoding proxy for third party devices 124.

In embodiments, code table building circuitry 514, agent manager circuitry 516, cloud adaptor circuitry 522 and/or third party coding/decoding proxy circuitry may at least be implemented with ASIC or programmable circuitry, such as FPGA. In alternate embodiments, one or more of code table building circuitry 514, agent manager circuitry 516, cloud adaptor circuitry 522 or third party coding/decoding proxy circuitry may at least be implemented in part in software. For these embodiments, IoT gateway 114 may include one or more physical hardware processors (not shown), each with one or more cores, and storage circuitry 512 or other storage circuitry (not shown) may be used to store the instructions to be executed by the one or more processors to implement the equivalent code table builder, agent manager, cloud adaptor and/or third party coding/decoding proxy. The one or more physical hardware processors may be any one of a number of single core or multi-core processors known in the art, and storage circuitry 512 may be any volatile or non-volatile memory known in the art.

Continuing to refer to FIG. 5, in embodiments, a cloud server 500 of cloud 126 configured to assist one or more IoT gateways 114 of one or more IoT networks in dynamically building and providing the respective code tables of the various IoT networks 102 of the IoT gateways may include storage circuitry 532 configured to store the code tables of the various IoT networks, and storage circuitry 534 configured to store identification information of the various IoT (smart) devices 112a-112n of the various IoT networks 102. Similar to IoT gateway 114, cloud server 500 may further include code table building circuitry 536 configured to dynamically build the code tables as described earlier (and in more detail later, with reference to FIG. 7). Additionally, cloud server 500 may include network interface circuitries (NIC) 540 coupled with code table building circuitry 536 to communicatively couple cloud server 500 with the various IoT gateways 114.

In some embodiments, cloud server 500 may further include gateway (GW) manager circuitry 538 coupled with code table building circuitry 536 and NIC 540 to manage the interactions with IoT gateways 114.

In embodiments, code table building circuitry 536, and/or gateway manager 538, may be implemented with ASIC or programmable circuitry, such as FPGA. In alternate embodiments, one or both of code table building circuitry 536 and GW manager circuitry 538 may at least be implemented in part in software. For these embodiments, cloud server 500 may include one or more physical hardware processors (not shown), each with one or more cores, and storage circuitry 532/534, or other storage circuitry (not shown) may be used to store the instructions to be executed by the one or more processors to implement the equivalent code table builder and/or GW manager. The one or more physical hardware processors may be any one of a number of single core or multi-core processors known in the art, and storage circuitry 532/534 may be any volatile or non-volatile memory known in the art.

Still referring to FIG. 5, an IoT (smart) device 112 of an IoT network 102 may include storage circuitry 502 configured to store the encoding and decoding tables of the IoT network 102, encoding/decoding circuitry 504 to encode/decode data/message traffics, and NIC 508 to communicatively couple IoT (smart) device 112 to IoT gateway 114 of the IoT network. In embodiments, IoT (smart) device 112 may further include agent manager circuitry 506 coupled with code table building circuitry 504 and NIC 508 to manage the interactions with IoT gateway 114.

In embodiments, encoding/decoding circuitry 504, and/or agent manager 506, may be implemented with ASIC or programmable circuitry, such as FPGA. In alternate embodiments, one or both of encoding/decoding circuitry 504 and agent manager circuitry 506 may at least be implemented in part in software. For these embodiments, IoT (smart) device 112 may include one or more physical hardware processors (not shown), each with one or more cores, and storage circuitry 502, or other storage circuitry (not shown) may be used to store the instructions to be executed by the one or more processors to implement the equivalent code table builder and/or agent manager. The one or more physical hardware processors may be any one of a number of single core or multi-core processors known in the art, and storage circuitry 502 may be any volatile or non-volatile memory known in the art.

Figure 6:
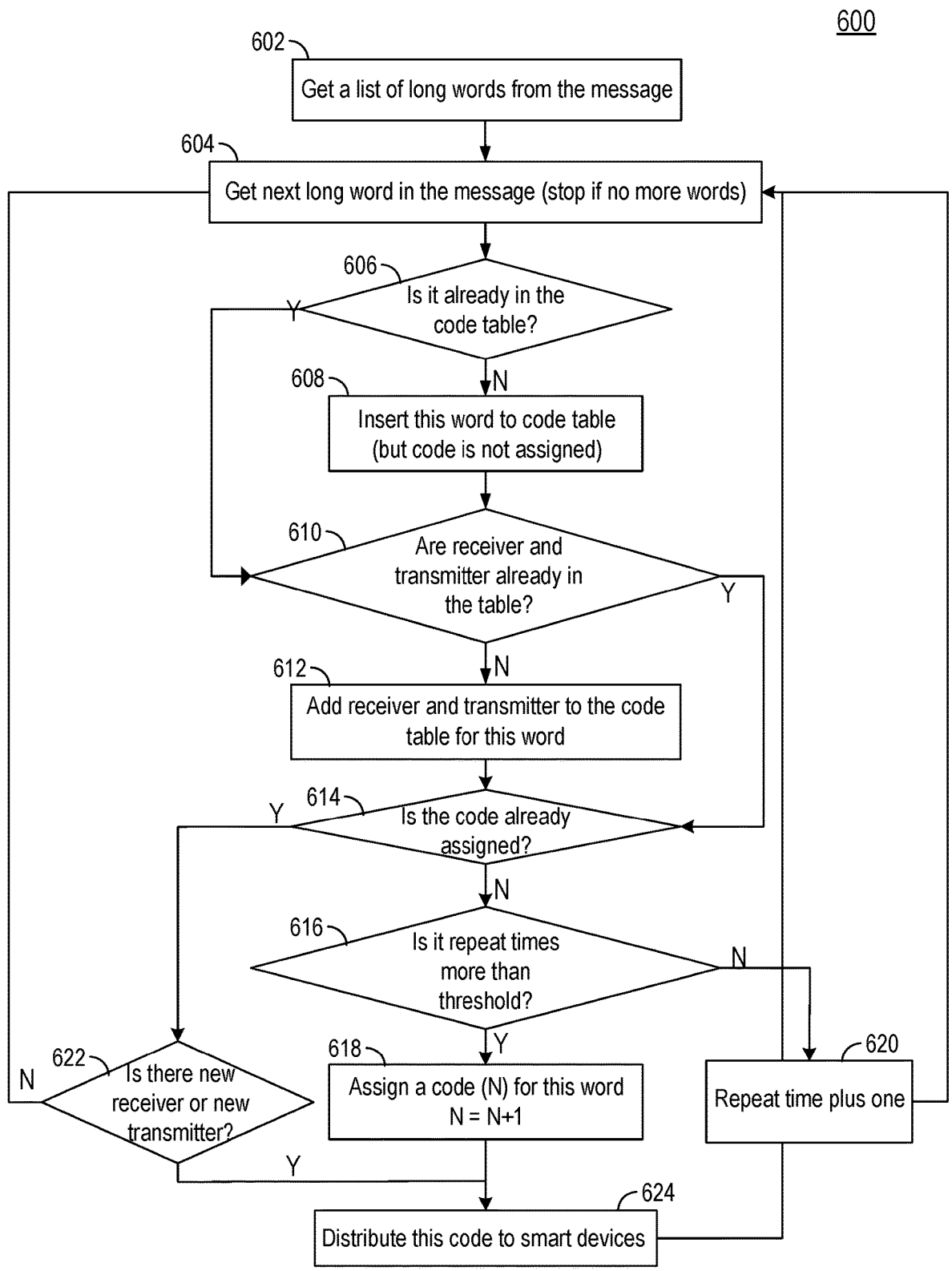
FIG. 6 illustrates an example process for an IoT gateway of an IoT network to dynamically build and provide a code table for the IoT (smart) devices of the IoT network, in accordance with various embodiments.

Referring now to FIG. 6, wherein an example process for an IoT gateway of an IoT network to dynamically build and provide a code table for the IoT network, in accordance with various embodiments, is shown. As illustrated, example process 600 for an IoT gateway of an IoT network to dynamically build and provide a code table for the IoT network may include operations performed at blocks 602-624. The operations may be performed e.g., by code table building circuitry 514 of an IoT gateway of FIG. 5. In alternate embodiments, some of the operations may be split or combined, or performed in different order.

Process 600 may start at block 602. At block 602, a list of long words detected/extracted from the messages exchanged among the IoT (smart) devices of the IoT network, and with the enterprise/public networks may be obtained. At 604, a next long word in the long word list may be obtained, unless all long words in the list have been processed. In such case, process 600 may end. Next, at block 606, on retrieval of a long word from the list, a determination may be made on whether the long word is already in the code table, i.e., whether the long word is encountered/detected for the first time. If a result of the determination indicates that the long word is already in the code table, process 600 may proceed to block 610. Otherwise, at block 608, the long word may be inserted into the code table and await assignment of a code, before proceeding to block 610.

At block 610, a determination may be made on whether a receiver and a transmitter associated with the long word is already in the code table, i.e., the long word is not detected/extracted from a message destined to or originated from an IoT (smart) device for the first time. If a result of the determination indicates that both the receiver and the transmitter associated with the long code is already in the code table, process 600 may proceed to block 614. Otherwise, at block 612, the new receiver and/or transmitter may be inserted into the code table for this long word, before proceeding to block 614.

At block 614, a determination may be made on whether a code has been assigned for the long code. If a result of the determination indicates that a code has not been assigned, process 600 may proceed to block 616, otherwise, process 600 may proceed to block 622. At block 616, a further determination may be made on whether the encountered/detection frequency of the long word has exceeded the frequency threshold. If a result of the determination indicates that the encountered/detection frequency of the long word has not exceeded the frequency threshold, process 600 may proceed to block 620, otherwise, at block 618, a code may be assigned to the long word. Thereafter, process 600 may proceed to block 624.

At block 620, the encountered/detection frequency of the long word may be increased. From block 620, process 600 may return to block 604, and continues therefrom as earlier described.

At block 622, a determination may be made on whether a new receiver or transmitter of an IoT (smart) device is encountered for the first time. If a result of the determination indicates that no new receiver or transmitter of an IoT (smart) device is encountered for the first time, process 600 may return to block 604, and continues therefrom as earlier described. Otherwise, process 600 may proceed to block 624.

At block 624, whether proceeded from block 618 or 622, the code table may be distributed to the IoT (smart) devices. In embodiments, for the newly encountered IoT (smart) devices, the entire code table may be provided; but for known IoT (smart) devices, updates to the code table may be provided.

Figure 7:
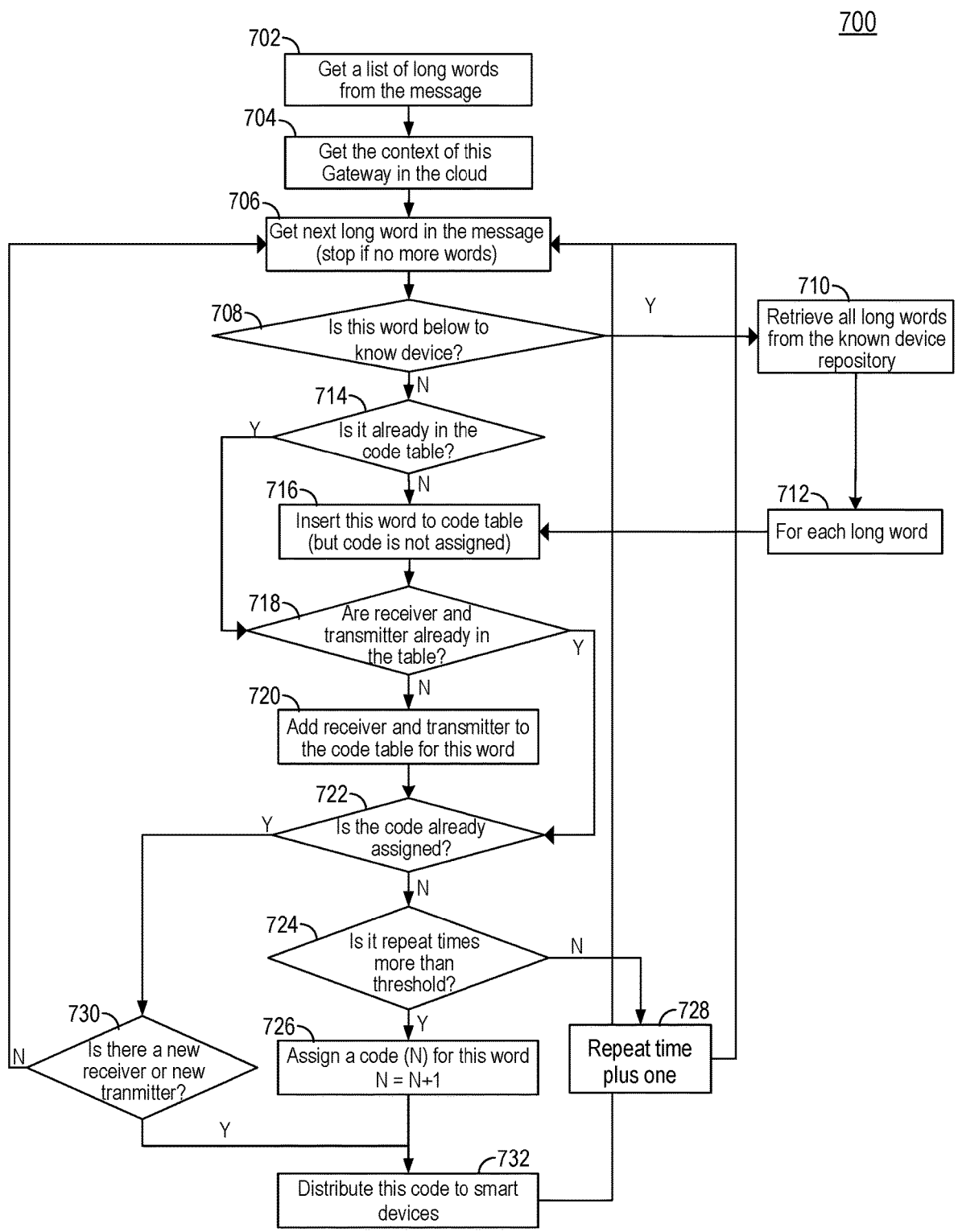
FIG. 7 illustrates an example process for a cloud server to support an IoT gateway of an IoT network to dynamically build and provide a code table for the IoT (smart) devices of the IoT network, in accordance with various embodiments.

Referring no FIG. 7, wherein an example process for a cloud server to dynamically build and provide a code table for an IoT network, in accordance with various embodiments, is shown. As illustrated, example process 700 for a cloud server to dynamically build and provide a code table for an IoT network may include operations performed at blocks 702 to 732. The operations may be performed e.g., by code table building circuitry 536 of a cloud server of FIG. 5. In alternate embodiments, some of the operations may be split or combined, or performed in different order.

Process 700 may start at block 702. At block 702, a list of long words detected/extracted by an IoT gateway of an IoT network from the messages exchanged among the IoT (smart) devices of the IoT network, and with the enterprise/public networks may be obtained. At 704, the context, i.e., the IoT network, of the IoT gateway may be obtained. Next, at block 706, a next long word in the list may be obtained, unless all long words in the list have been processed. In such case, process 700 may end. Next, at block 708, on retrieval of a long word from the list, a determination may be made on whether the long word belongs to a known device (which may be of any IoT network). If a result of the determination indicates that the long word belongs to a known device, process 700 may proceed to block 710, otherwise process 700 may proceed to block 714.

At block 710, all long words belong to the known device may be retrieved from the device repository. Next at block 712, the operations at block 716 is performed for each long word belong to the known device.

At block 714, a further determination may be made on whether the long word is already in the code table used by this IoT network. If a result of the determination indicates that the long word is not already in the code table, process 700 may proceed to block 716, otherwise process 700 may proceed to block 718.

At block 716, whether proceeded from block 712 or block 714, the long word may be inserted into the code table for this IoT network. Next, at block 718, a determination may be made on whether the receiver and the transmitter associated with the long word are already in the code table, i.e., the long word is not detected/extracted from a message destined to or originated from an IoT (smart) device of this IoT network for the first time. If a result of the determination indicates that both the receiver and the transmitter associated with the long code is already in the code table of the IoT network, process 700 may proceed to block 722. Otherwise, at block 720, the new receiver and/or transmitter may be inserted into the code table of the IoT network for this long word, before proceeding to block 722.

At block 722, a determination may be made on whether a code has been assigned for the long code. If a result of the determination indicates that a code has not been assigned, process 700 may proceed to block 724, otherwise, process 700 may proceed to block 730. At block 724, a further determination may be made on whether the encountered/detection frequency of the long word has exceeded the frequency threshold. If a result of the determination indicates that the encountered/detection frequency of the long word has not exceeded the frequency threshold, process 700 mat proceed to block 728, otherwise, at block 726, a code may be assigned to the long word. Thereafter process 600 may proceed to block 732.

At block 728, the encountered/detection frequency of the long word may be increased. From block 728, process 700 may return to block 706, and continue therefrom as earlier described.

At block 730, a determination may be made on whether a new receiver or transmitter of an IoT (smart) device is encountered for the first time. If a result of the determination indicates that no new receiver or transmitter of an IoT (smart) device is encountered for the first time, process 700 may return to block 706, and continue therefrom as earlier described. Otherwise, process 700 may proceed to block 732.

At block 732, whether proceeded from block 726 or 730, the code table may be distributed to the IoT (smart) devices of the IoT network through the IoT gateway of the IoT network. In embodiments, for the newly encountered IoT (smart) devices of the IoT network, the entire code table is provided; but for known IoT (smart) devices, updates to the code table are provided.

In embodiments, operations 702-732 may be repeated for different IoT gateways of different IoT networks supported.

Figure 8:
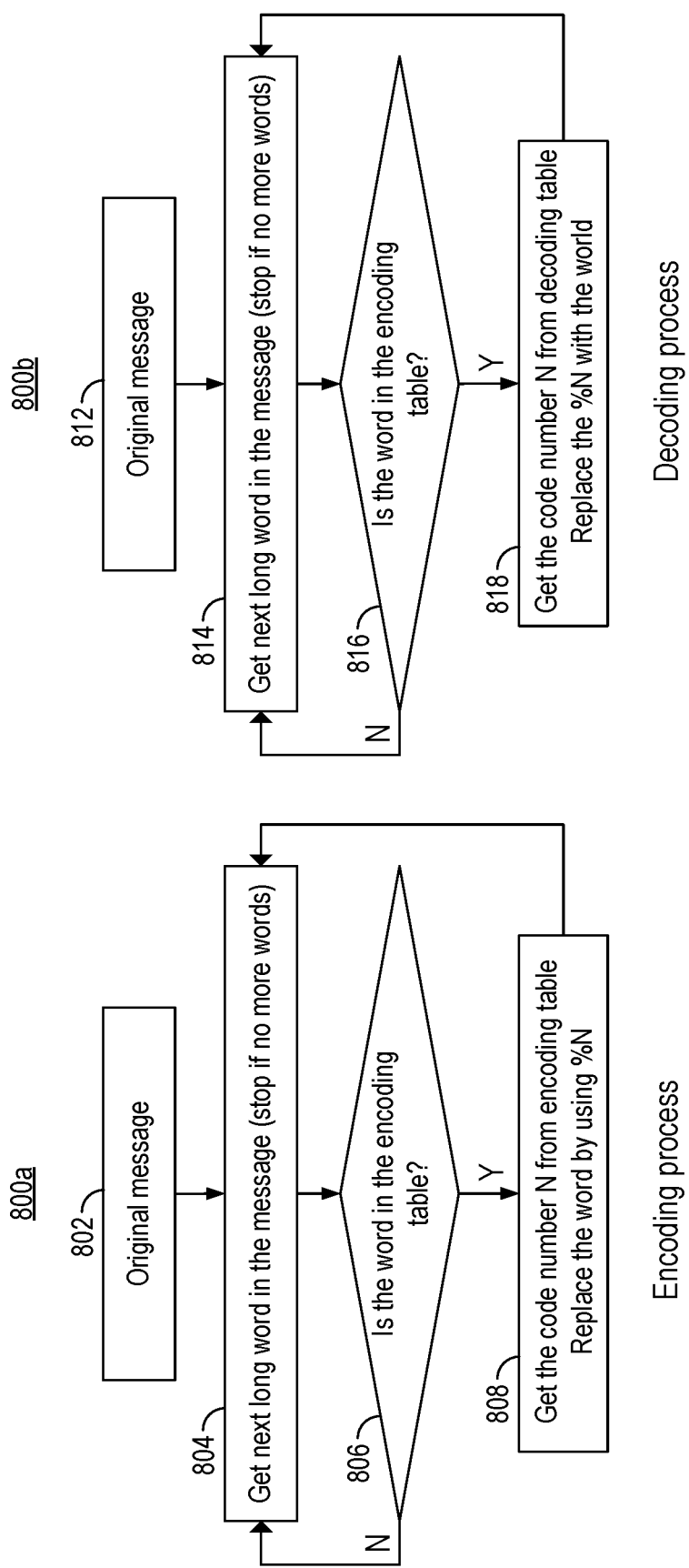
FIG. 8 illustrates example processes for encoding/decoding by an IoT (smart) device of an IoT network, in accordance with various embodiments.

Referring now to FIG. 8, wherein example processes for encoding/decoding by an IoT (smart) device, in accordance with various embodiments, is shown. As illustrated, for the embodiments, encoding process 800*a* may include operations performed at blocks 802-808, whereas encoding process 800*b* may include operations performed at blocks 812-818.

Process 800*a* may start at block 802. At block 802, an original message may be received. Next at block 804, a next word in the message may be obtained, unless all words in the message has been processed. At such time, process 800*a* may terminate. On retrieval of a word, at block 806, a determination may be made on whether the word is in the encoding table. If a result of the determination indicates that the word is in not in code table, process 800*a* may return to block 804, and proceed therefrom as earlier described, otherwise, process 800*a* may proceed to block 808. At block 808, the code may be retrieved from the code, and the word may be replaced by the code. In embodiments, the code may be appended to a special symbol identifying the character/numeric as a code, e.g., for a code N, the code N may be appended to the special symbol %, forming % N. Thereafter, the process may return to block 804, and continues and proceed therefrom as earlier described.

Process 800*b* may start at block 812. At block 812, an encoded message may be received. Next at block 814, a next word in the message may be obtained, unless all words in the message has been processed. At such time, process 800*b* may terminate. On retrieval of a word, at block 816, a determination may made on whether the word is prefixed with a special symbol, e.g., %, denoting that the remainder of the word is a code. If a result of the determination indicates that the word is in not a code, process 800*b* may return to block 824, and proceed therefrom as earlier described, otherwise, process 800*b* may proceed to block 818. At block 818, the long word may be retrieved from the code, and the code (including the special symbol) may be replaced by the long word. Thereafter, the process may return to block 814, and continue and proceed therefrom as earlier described.

Figure 9:
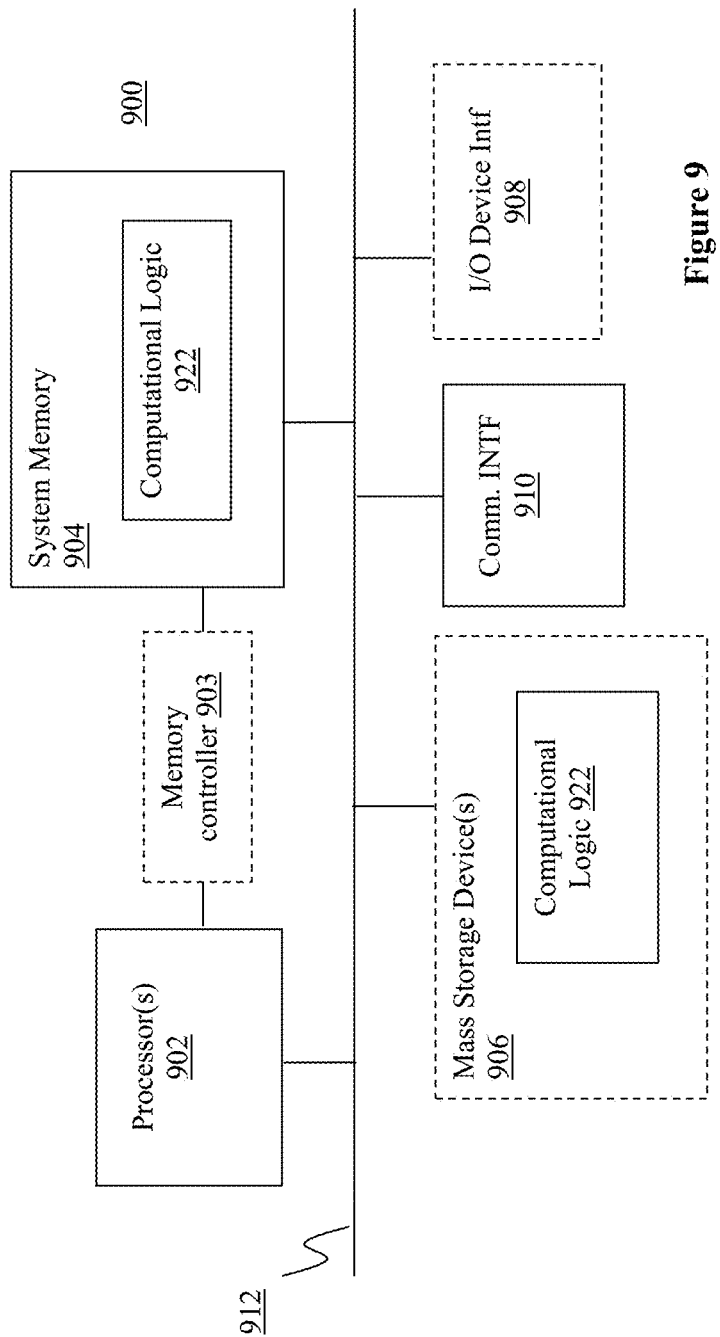
FIG. 9 illustrates an example computing device, suitable for use as an IoT (smart) device, an IoT gateway or a cloud server, in accordance with various embodiments.

Referring now to FIG. 9, wherein a block diagram of a computer device suitable for use as an IoT (smart) device, an IoT gateway or a cloud server, in accordance with various embodiments, is illustrated. As shown, computer device 900 may include one or more processors 902, system memory 904 and communication interface 910. Processor 902 may be any microcontroller, single core or multi-core processors known in the art, and system memory 904 may include any known volatile or non-volatile memory. Similarly, communication interfaces 910 may be any known communication interfaces (such as network interface cards) configured to support wireless communication.

For embodiments for use as an I/O gateway or a cloud server, computer 900 may further include optional memory controller 903, which may be also be any one of a number of memory controllers known in the art. Additionally, for embodiments for use as a cloud server, computer device 900 may further include optional mass storage device(s) 906 (such as solid state drives), and/or input/output device interface 908 (to interface with various input/output devices, such as, mouse, cursor control, display device (including touch sensitive screen), and so forth). The elements may be coupled to each other via system bus 912, which may represent one or more buses. In the case of multiple buses, they may be bridged by one or more bus bridges (not shown).

Each of these elements may perform its conventional functions known in the art. In particular, system memory 904 and/or mass storage device(s) 906 may be employed to store a working copy and/or a permanent copy of the executable code of the programming instructions of software implementations of encoding/decoding circuitry 504 and/or agent circuitry 506 of an I/O (smart) device 112, code table building circuitry 514, agent manager circuitry 516 and/or cloud adaptor circuitry 522 of IoT gateway 114, and/or code table building circuitry 536, and/or gateway manager circuitry 538, collectively referred to as computing logic 922. The programming instructions may comprise assembler instructions supported by processor(s) 902 or high-level languages, such as, for example, C, that can be compiled into such instructions.

The permanent copy of the executable code of the programming instructions may be placed into storage device(s) 904 and/or 906 in the factory, or in the field, through, for example, a distribution medium (not shown), such as a compact disc (CD), or through communication interface 910 (from a distribution server (not shown)).

The number, capability and/or capacity of these elements 910-912 may vary, depending on the intended use of example computer device 900, e.g., whether example computer device 900 is used as an IoT (smart) device 112, an IoT gateway 114 or a cloud server 126. The constitutions of these elements 910-912 are otherwise known, and accordingly will not be further described.

Figure 10:
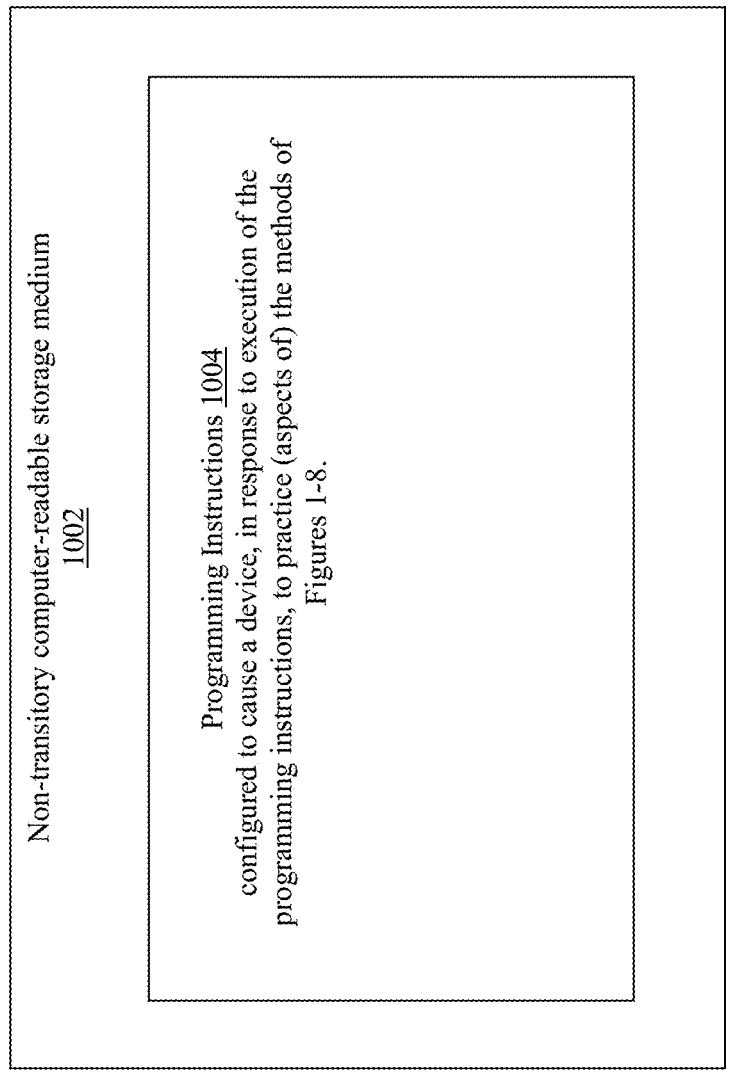
FIG. 10 illustrates an example storage medium with instructions configured to enable an IoT gateway or a cloud Server to practice the present disclosure, in accordance with various embodiments.

FIG. 10 illustrates an example storage medium with instructions configured to enable an IoT (smart) device, an IoT gateway or a Cloud Server to practice all or selected ones of the operations associated with dynamic building of code tables for IoT networks, earlier described, in accordance with various embodiments. As illustrated, non-transitory computer-readable storage medium 1002 may include the executable code of a number of programming instructions 1004. Executable code of programming instructions 1004 may be configured to enable a device, e.g., an IoT (smart) device 112, an IoT gateway 114 or a cloud server 126, in response to execution of the executable code/programming instructions, to perform, e.g., various operations associated dynamic building and/or providing of code tables for various IoT networks, described with references to FIGS. 1-8. In alternate embodiments, executable code/programming instructions 1004 may be disposed on multiple non-transitory computer-readable storage medium 1002 instead. In still other embodiments, executable code/programming instructions 1004 may be encoded in transitory computer readable medium, such as signals.

In embodiments, a processor may be packaged together with a computer-readable storage medium having some or all of executable code of programming instructions 1004 configured to practice all or selected ones of the operations earlier described with references to FIG. 1-8. For one embodiment, a processor may be packaged together with such executable code 1004 to form a System in Package (SiP). For one embodiment, a processor may be integrated on the same die with a computer-readable storage medium having such executable code 1004. For one embodiment, a processor may be packaged together with a computer-readable storage medium having such executable code 1004 to form a System on Chip (SoC). For at least one embodiment, the SoC may be utilized in, e.g., an IoT gateway 114 or a cloud server 126.

Figure 11:
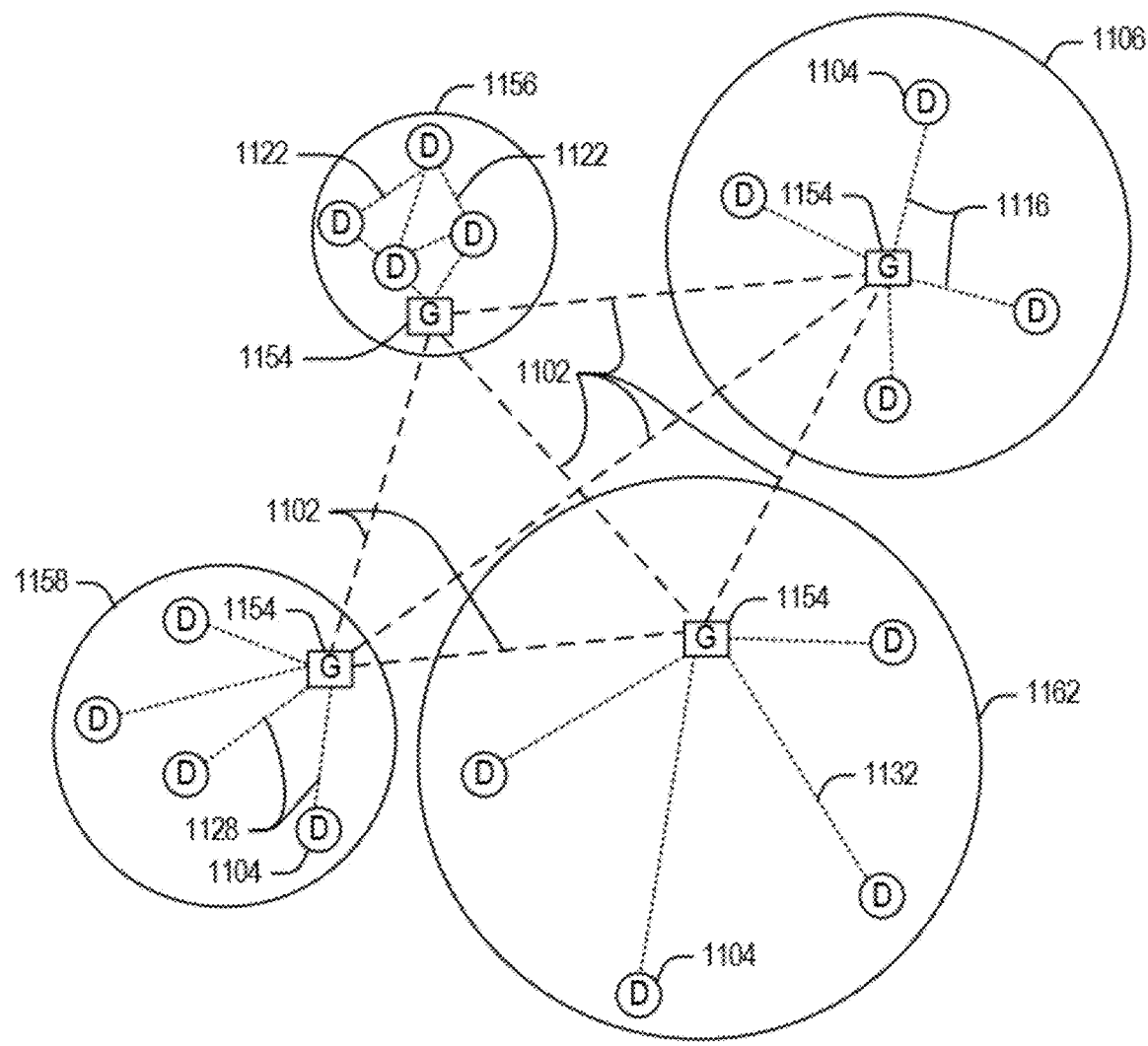
FIG. 11 illustrates an domain topology for respective internet-of-things (IoT) networks coupled through links to respective gateways, according to an example.

FIG. 11 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 12:
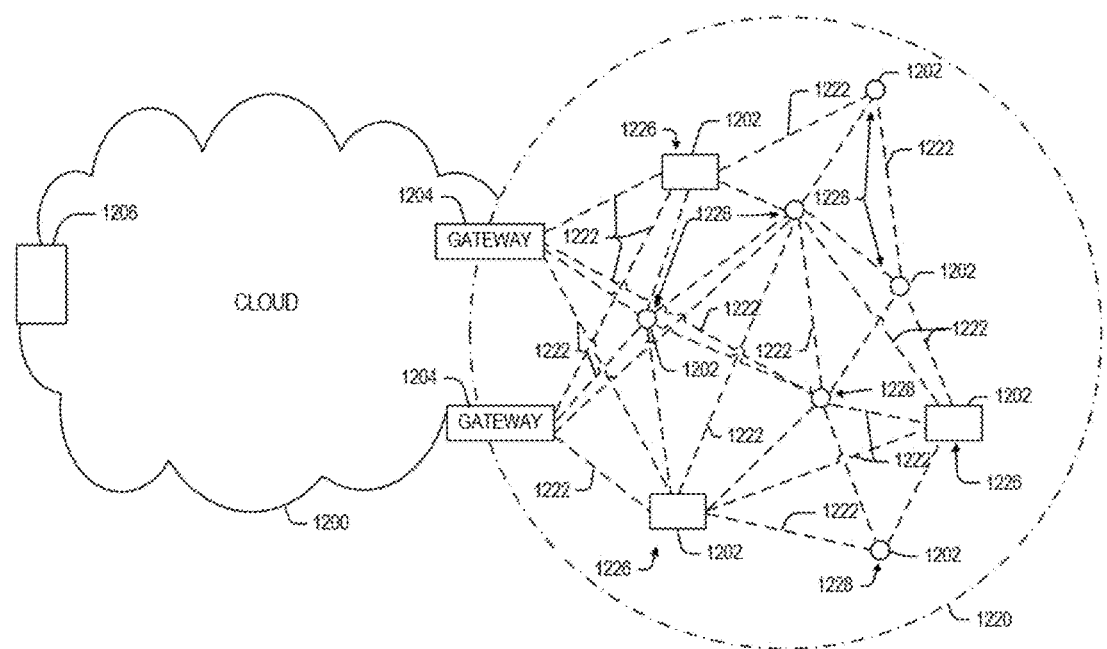
FIG. 12 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 11 and 12, present a number of new challenges in a heterogeneous network of connectivity comprising a combination of wired and wireless technologies.

FIG. 11 specifically provides a simplified drawing of a domain topology that may be used for a number of internet-of-things (IoT) networks comprising IoT devices 1104, with the IoT networks 1156, 1158, 1160, 1162, coupled through backbone links 1102 to respective gateways 1154. For example, a number of IoT devices 1104 may communicate with a gateway 1154, and with each other through the gateway 1154. To simplify the drawing, not every IoT device 1104, or communications link (e.g., link 1116, 1122, 1128, or 1132) is labeled. The backbone links 1102 may include any number of wired or wireless technologies, including optical networks, and may be part of a local area network (LAN), a wide area network (WAN), or the Internet. Additionally, such communication links facilitate optical signal paths among both IoT devices 1104 and gateways 1154, including the use of MUXing/deMUXing components that facilitate interconnection of the various devices.

The network topology may include any number of types of IoT networks, such as a mesh network provided with the network 1156 using Bluetooth low energy (BLE) links 1122. Other types of IoT networks that may be present include a wireless local area network (WLAN) network 1158 used to communicate with IoT devices 1104 through IEEE 802.11 (Wi-Fi®) links 1128, a cellular network 1160 used to communicate with IoT devices 1104 through an LTE/LTE-A (4G) or 5G cellular network, and a low-power wide area (LPWA) network 1162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1104, such as over the backbone links 1102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1158, for instance, may use systems that perform standards conversion to provide multi-standard connectivity, enabling IoT devices 1104 using different protocols to communicate. Further systems may provide seamless interconnectivity across a multi-standard infrastructure comprising visible Internet resources and hidden Internet resources.

Communications in the cellular network 1160, for instance, may be enhanced by systems that offload data, extend communications to more remote devices, or both. The LPWA network 1162 may include systems that perform non-Internet protocol (IP) to IP interconnections, addressing, and routing. Further, each of the IoT devices 1104 may include the appropriate transceiver for wide area communications with that device. Further, each IoT device 1104 may include other transceivers for communications using additional protocols and frequencies. This is discussed further with respect to the communication environment and hardware of an IoT processing device depicted in FIGS. 13 and 14.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 12 below.

FIG. 12 illustrates a cloud computing network in communication with a mesh network of IoT devices (devices 1202) operating as a fog device at the edge of the cloud computing network. The mesh network of IoT devices may be termed a fog 1220, operating at the edge of the cloud 1200. To simplify the diagram, not every IoT device 1202 is labeled.

The fog 1220 may be considered to be a massively interconnected network wherein a number of IoT devices 1202 are in communications with each other, for example, by radio links 1222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.-M.A.N.) routing protocol, or the OMA Lightweight M2M (LWM2M) protocol, among others.

Three types of IoT devices 1202 are shown in this example, gateways 1204, data aggregators 1226, and sensors 1228, although any combinations of IoT devices 1202 and functionality may be used. The gateways 1204 may be edge devices that provide communications between the cloud 1200 and the fog 1220, and may also provide the backend process function for data obtained from sensors 1228, such as motion data, flow data, temperature data, and the like. The data aggregators 1226 may collect data from any number of the sensors 1228, and perform the back end processing function for the analysis. The results, raw data, or both may be passed along to the cloud 1200 through the gateways 1204. The sensors 1228 may be full IoT devices 1202, for example, capable of both collecting data and processing the data. In some cases, the sensors 1228 may be more limited in functionality, for example, collecting the data and allowing the data aggregators 1226 or gateways 1204 to process the data.

Communications from any IoT device 1202 may be passed along a convenient path (e.g., a most convenient path) between any of the IoT devices 1202 to reach the gateways 1204. In these networks, the number of interconnections provide substantial redundancy, allowing communications to be maintained, even with the loss of a number of IoT devices 1202. Further, the use of a mesh network may allow IoT devices 1202 that are very low power or located at a distance from infrastructure to be used, as the range to connect to another IoT device 1202 may be much less than the range to connect to the gateways 1204.

The fog 1220 provided from these IoT devices 1202 may be presented to devices in the cloud 1200, such as a server 1206, as a single device located at the edge of the cloud 1200, e.g., a fog device. In this example, the alerts coming from the fog device may be sent without being identified as coming from a specific IoT device 1202 within the fog 1220. In this fashion, the fog 1220 may be considered a distributed platform that provides computing and storage resources to perform processing or data-intensive tasks such as data analytics, data aggregation, and machine-learning, among others.

In some examples, the IoT devices 1202 may be configured using an imperative programming style, e.g., with each IoT device 1202 having a specific function and communication partners. However, the IoT devices 1202 forming the fog device may be configured in a declarative programming style, allowing the IoT devices 1202 to reconfigure their operations and communications, such as to determine needed resources in response to conditions, queries, and device failures. As an example, a query from a user located at a server 1206 about the operations of a subset of equipment monitored by the IoT devices 1202 may result in the fog 1220 device selecting the IoT devices 1202, such as particular sensors 1228, needed to answer the query. The data from these sensors 1228 may then be aggregated and analyzed by any combination of the sensors 1228, data aggregators 1226, or gateways 1204, before being sent on by the fog 1220 device to the server 1206 to answer the query. In this example, IoT devices 1202 in the fog 1220 may select the sensors 1228 used based on the query, such as adding data from flow sensors or temperature sensors. Further, if some of the IoT devices 1202 are not operational, other IoT devices 1202 in the fog 1220 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 13:
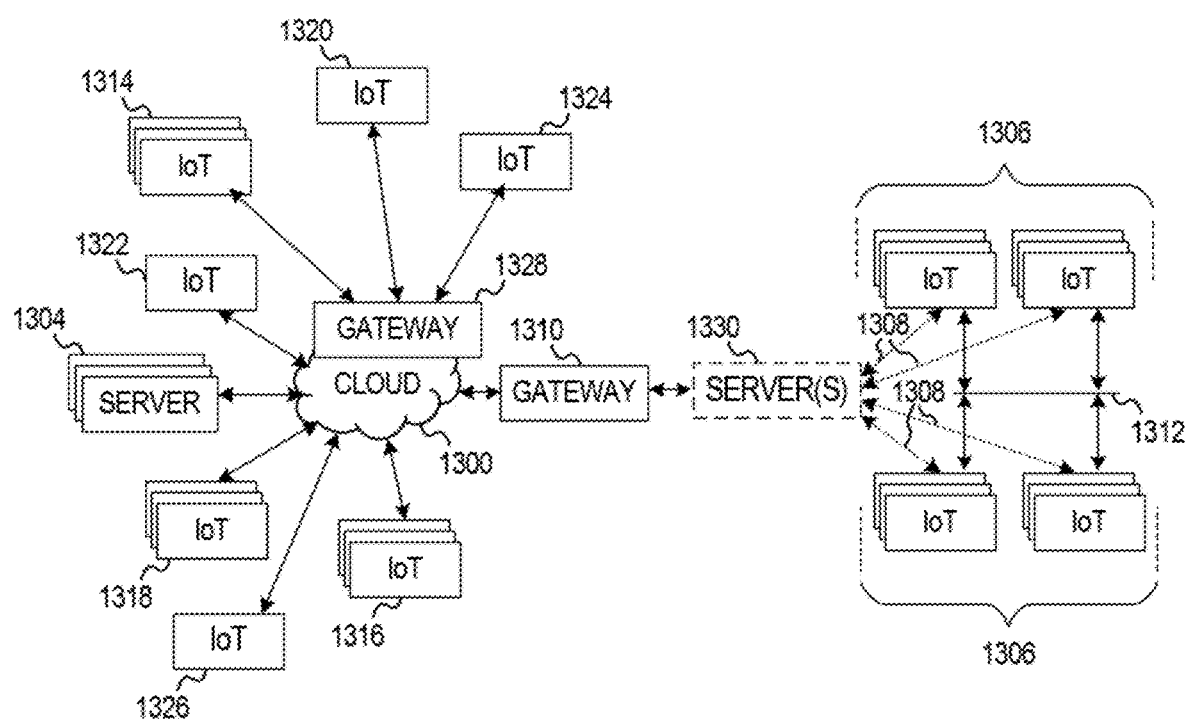
FIG. 13 illustrates a block diagram of a network illustrating communications among a number of IoT devices, according to an example.

FIG. 13 illustrates a drawing of a cloud computing network, or cloud 1300, in communication with a number of Internet of Things (IoT) devices. The cloud 1300 may represent the Internet, or may be a local area network (LAN), or a wide area network (WAN), such as a proprietary network for a company. The IoT devices may include any number of different types of devices, grouped in various combinations. For example, a traffic control group 1306 may include IoT devices along streets in a city. These IoT devices may include stoplights, traffic flow monitors, cameras, weather sensors, and the like. The traffic control group 1306, or other subgroups, may be in communication with the cloud 1300 through wired or wireless links 1308, such as LPWA links, optical links, and the like. Further, a wired or wireless sub-network 1312 may allow the IoT devices to communicate with each other, such as through a local area network, a wireless local area network, and the like. The IoT devices may use another device, such as a gateway 1310 or 1328 to communicate with remote locations such as the cloud 1300; the IoT devices may also use one or more servers 1330 to facilitate communication with the cloud 1300 or with the gateway 1310. For example, the one or more servers 1330 may operate as an intermediate network node to support a local edge cloud or fog implementation among a local area network. Further, the gateway 1328 that is depicted may operate in a cloud-to-gateway-to-many edge devices configuration, such as with the various IoT devices 1314, 1320, 1324 being constrained or dynamic to an assignment and use of resources in the cloud 1300.

Other example groups of IoT devices may include remote weather stations 1314, local information terminals 1316, alarm systems 1318, automated teller machines 1320, alarm panels 1322, or moving vehicles, such as emergency vehicles 1324 or other vehicles 1326, among many others. Each of these IoT devices may be in communication with other IoT devices, with servers 1304, with another IoT fog device or system (not shown, but depicted in FIG. 12), or a combination therein. The groups of IoT devices may be deployed in various residential, commercial, and industrial settings (including in both private or public environments).

As can be seen from FIG. 13, a large number of IoT devices may be communicating through the cloud 1300. This may allow different IoT devices to request or provide information to other devices autonomously. For example, a group of IoT devices (e.g., the traffic control group 1306) may request a current weather forecast from a group of remote weather stations 1314, which may provide the forecast without human intervention. Further, an emergency vehicle 1324 may be alerted by an automated teller machine 1320 that a burglary is in progress. As the emergency vehicle 1324 proceeds towards the automated teller machine 1320, it may access the traffic control group 1306 to request clearance to the location, for example, by lights turning red to block cross traffic at an intersection in sufficient time for the emergency vehicle 1324 to have unimpeded access to the intersection.

Clusters of IoT devices, such as the remote weather stations 1314 or the traffic control group 1306, may be equipped to communicate with other IoT devices as well as with the cloud 1300. This may allow the IoT devices to form an ad-hoc network between the devices, allowing them to function as a single device, which may be termed a fog device or system (e.g., as described above with reference to FIG. 12).

Figure 14:
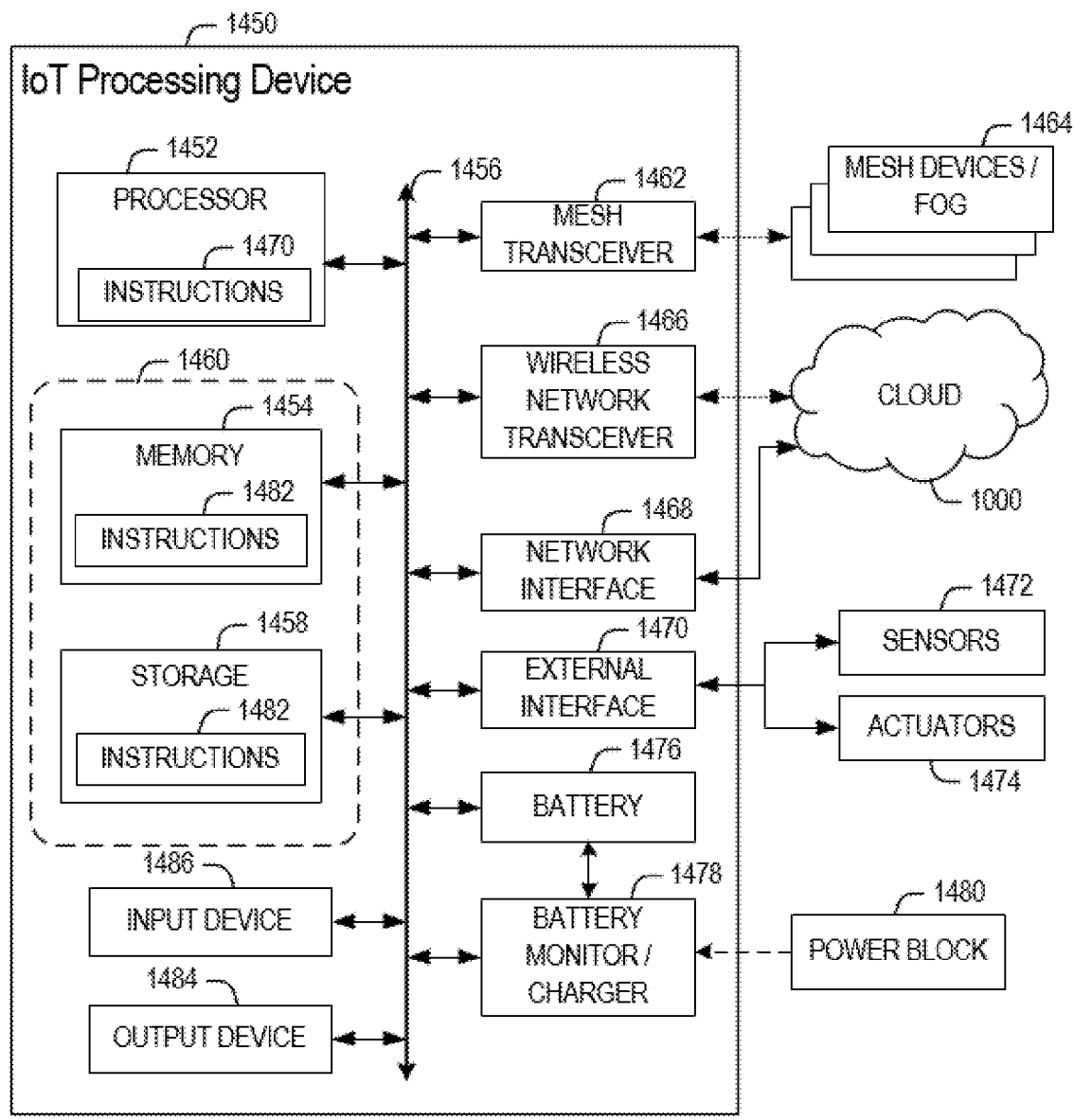
FIG. 14 illustrates a block diagram for an example IoT processing system architecture upon which any one or more of the techniques (e.g., operations, processes, methods, and methodologies) discussed herein may be performed, according to an example.

FIG. 14 is a block diagram of an example of components that may be present in an IoT device 1450 for implementing the techniques described herein. The IoT device 1450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1450, or as components otherwise incorporated within a chassis of a larger system. Additionally, the block diagram of FIG. 14 is intended to depict a high-level view of components of the IoT device 1450. However, some of the components shown may be omitted, additional components may be present, and different arrangement of the components shown may occur in other implementations.

The IoT device 1450 may include a processor 1452, which may be a microprocessor, a multi-core processor, a multithreaded processor, an ultra-low voltage processor, an embedded processor, or other known processing element. The processor 1452 may be a part of a system on a chip (SoC) in which the processor 1452 and other components are formed into a single integrated circuit, or a single package, such as the Edison™ or Galileo™ SoC boards from Intel. As an example, the processor 1452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1452 may communicate with a system memory 1454 over an interconnect 1456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example the storage 1458 may be implemented via a solid state disk drive (SSDD). Other devices that may be used for the storage 1458 include flash memory cards, such as SD cards, microSD cards, xD picture cards, and the like, and USB flash drives. In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in a SoC based system. Other bus systems may be included, such as an I2C interface, an SPI interface, point to point interfaces, and a power bus, among others.

The interconnect 1456 may couple the processor 1452 to a mesh transceiver 1462, for communications with other mesh devices 1464. The mesh transceiver 1462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1462 may communicate using multiple standards or radios for communications at different range. For example, the IoT device 1450 may communicate with close devices, e.g., within about 10 meters, using a local transceiver based on BLE, or another low power radio, to save power. More distant mesh devices 1464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1466 may be included to communicate with devices or services in the cloud 1400 via local or wide area network protocols. The wireless network transceiver 1466 may be a LPWA transceiver that follows the IEEE 802.15.4, or IEEE 802.15.4g standards, among others. The IoT device 1450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1462 and wireless network transceiver 1466, as described herein. For example, the radio transceivers 1462 and 1466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1462 and 1466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1468 may be included to provide a wired communication to the cloud 1400 or to other devices, such as the mesh devices 1464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1468 may be included to allow connect to a second network, for example, a NIC 1468 providing communications to the cloud over Ethernet, and a second NIC 1468 providing communications to other devices over another type of network.

The interconnect 1456 may couple the processor 1452 to an external interface 1470 that is used to connect external devices or subsystems. The external devices may include sensors 1472, such as accelerometers, level sensors, flow sensors, optical light sensors, camera sensors, temperature sensors, a global positioning system (GPS) sensors, pressure sensors, barometric pressure sensors, and the like. The external interface 1470 further may be used to connect the IoT device 1450 to actuators 1474, such as power switches, valve actuators, an audible sound generator, a visual warning device, and the like.

In some optional examples, various input/output (I/O) devices may be present within, or connected to, the IoT device 1450. For example, a display or other output device 1484 may be included to show information, such as sensor readings or actuator position. An input device 1486, such as a touch screen or keypad may be included to accept input. An output device 1484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1450.

A battery 1476 may power the IoT device 1450, although in examples in which the IoT device 1450 is mounted in a fixed location, it may have a power supply coupled to an electrical grid. The battery 1476 may be a lithium ion battery, or a metal-air battery, such as a zinc-air battery, an aluminum-air battery, a lithium-air battery, and the like.

A battery monitor/charger 1478 may be included in the IoT device 1450 to track the state of charge (SoCh) of the battery 1476. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1478 may communicate the information on the battery 1476 to the processor 1452 over the interconnect 1456. The battery monitor/charger 1478 may also include an analog-to-digital (ADC) convertor that allows the processor 1452 to directly monitor the voltage of the battery 1476 or the current flow from the battery 1476. The battery parameters may be used to determine actions that the IoT device 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the IoT device 1450. A wireless battery charging circuit, such as an LTC4020 chip from Linear Technologies of Milpitas, Calif., among others, may be included in the battery monitor/charger 1478. The specific charging circuits chosen depend on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine readable medium 1460 including code to direct the processor 1452 to perform electronic operations in the IoT device 1450. The processor 1452 may access the non-transitory, machine readable medium 1460 over the interconnect 1456. For instance, the non-transitory, machine readable medium 1460 may be embodied by devices described for the storage 1458 of FIG. 13 or may include specific storage units such as optical disks, flash drives, or any number of other hardware devices. The non-transitory, machine readable medium 1460 may include instructions to direct the processor 1452 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Thus, an improved method and apparatus for dynamically building and providing a code table for an IoT network has been described.

Example 1 may be an apparatus for communicatively coupling a plurality of Internet-of-Things (IoT) devices of an IoT network to each other, and to an enterprise or public network, comprising first networking circuitry to communicatively couple the apparatus with the plurality of the IoT devices of the IoT network; second networking circuitry to communicatively couple the apparatus with the enterprise or public network; routing circuitry coupled to the first and second networking circuitries; and code table building circuitry coupled with the first and second networking circuitries to dynamically provide a code table to the IoT devices to use to exchange messages with each other, or with other devices on the enterprise or public network, based at least in part on words in the messages exchanged.

Example 2 may be example 1, wherein to dynamically build and provide the code table, the code table building circuitry may monitor and analyze the messages exchanged between the IoT devices or the messages exchanged between the IoT devices and the enterprise or public network.

Example 3 may be example 2, wherein the code table building circuitry may detect long words in the messages exchanged between the IoT devices or the messages exchanged between the IoT devices and the enterprise or public network, that have word lengths greater than a word length threshold.

Example 4 may be example 3, wherein the code table building circuitry may further assign codes to at least some of the long words, and add coding entries into the coding table mapping the at least some of the long words to the assigned codes.

Example 5 may be example 4, wherein the code table building circuitry may further track encountered frequencies of the long words, and the at least some of the long words that get assigned codes are new unique long words without assigned codes with encountered frequencies in excess of a frequency threshold.

Example 6 may be example 3, wherein the code table building circuitry may send the long words to a cloud server to have codes assigned to at least some of the long words, receive in response from the cloud server, a coding table with coding entries mapping at least some of the long words to assigned codes, or updates to the coding table.

Example 7 may be example 6, further comprising cloud adapter circuitry coupled to the second networking circuitry and the code table building circuitry to receive the messages exchanged between the IoT devices and the enterprise or public network; to provide the long words to the cloud server; and to receive in response from the cloud server, the code table or updates to the code table.

Example 8 may be example 1, wherein to provide the code table to the IoT devices, the code table building circuitry may provide the code table, after initial formation of the code table, to an IoT device, when the IoT device first sends or receives a message.

Example 9 may be example 1, wherein the code table building circuitry may further periodically send updates for the code table to the IoT devices.

Example 10 may be example 9 further comprising agent manager circuitry coupled to the first networking circuitry and the code table building circuitry to receive the messages exchanged between the IoT devices or messages exchanged between the IoT devices and the enterprise or public network; or to provide the code table and updates to the code table to the IoT devices.

Example 11 may be any one of examples 1-10, further comprising third party coding and decoding circuitries coupled with the first and second networking circuitries to code and decode messages exchanged between the IoT devices and some of the devices of the enterprise or public network, on behalf of the some of the devices of the enterprise or public network.

Example 12 may be example 11, wherein the apparatus is a member of the IoT network or the enterprise network may comprise a Fog network.

Example 13 may be a method for facilitating sending and receiving messages by Internet-of-Things (IoT) devices, comprising: receiving and routing, by a IoT gateway, messages exchanged among a plurality of IoT devices of an IoT network, or messages exchanged between the IoT devices and other devices of an enterprise or public network; and dynamically providing a code table to the IoT devices to use to exchange messages with each other, or with the other devices on the enterprise or public network, based at least in part on words in the messages exchanged.

Example 14 may be example 13, further comprising monitoring and analyzing the messages exchanged between the IoT devices or the messages exchanged between the IoT devices and the enterprise or public network.

Example 15 may be example 14, further comprising detecting long words in the messages exchanged between the IoT devices or the messages exchanged between the IoT devices and the enterprise or public network, that have word lengths greater than a word length threshold.

Example 16 may be example 15, further comprising assigning codes to at least some of the long words, and adding coding entries into the coding table mapping the at least some of the long words to the assigned codes.

Example 17 may be example 16, further comprising tracking encountered frequencies of the long words, and the at least some of the long words that get assigned codes are new unique long words without assigned codes with encountered frequencies in excess of a frequency threshold.

Example 18 may be any one of examples 15-17, further comprising sending the long words to a cloud server to have codes assigned to at least some of the long words, receiving in response from the cloud server, a coding table with coding entries mapping at least some of the long words to assigned codes, or updates to the coding table.

Example 19 may be example 18, further comprising receiving the messages exchanged between the IoT devices and the enterprise or public network; providing the long words to the cloud server; and receiving in response from the cloud server, the code table or updates to the code table.

Example 20 may be at least one computer readable media (CRM) comprising a plurality of instructions arranged to cause an Internet-of-Things (IoT) gateway, in response to execution of the instructions by the IoT gateway, to: receive and route messages exchanged among a plurality of IoT devices of an IoT network, or messages exchanged between the IoT devices and other devices of an enterprise or public network; and dynamically provide a code table to the IoT devices to use to exchange messages with each other, or with the other devices on the enterprise or public network, based at least in part on words in the messages exchanged.

Example 21 may be example 20, wherein the TOT gateway may be further caused to monitor and analyze the messages exchanged between the IoT devices or the messages exchanged between the IoT devices and the enterprise or public network.

Example 22 may be example 21, wherein the TOT gateway may be further caused to detect long words in the messages exchanged between the IoT devices or the messages exchanged between the IoT devices and the enterprise or public network, that have word lengths greater than a word length threshold.

Example 23 may be example 22, wherein the TOT gateway may be further caused to assign codes to at least some of the long words, and add coding entries into the coding table mapping the at least some of the long words to the assigned codes.

Example 24 may be example 23, wherein the TOT gateway may be further caused to track encountered frequencies of the long words, and the at least some of the long words that get assigned codes are new unique long words without assigned codes with encountered frequencies in excess of a frequency threshold.

Example 25 may be any one of examples 22-24, wherein the TOT gateway may be further caused to send the long words to a cloud server to have codes assigned to at least some of the long words, receiving in response from the cloud server, a coding table with coding entries mapping at least some of the long words to assigned codes, or updates to the coding table.

Example 26 may be example 25, wherein the TOT gateway may be further caused to receive the messages exchanged between the IoT devices and the enterprise or public network; provide the long words to the cloud server; and receive in response from the cloud server, the code table or updates to the code table.

Example 27 may be a system for communicatively coupling a plurality of Internet-of-Things (IoT) devices of an IoT network to each other, and to an enterprise or public network, comprising: first networking circuitry to communicatively couple the apparatus with the plurality of the IoT devices of the IoT network; second networking circuitry to communicatively couple the apparatus with the enterprise or public network; routing circuitry coupled to the first and second networking circuitries; and means for dynamically providing a code table to the IoT devices to use to exchange messages with each other, or with other devices on the enterprise or public network, based at least in part on words in the messages exchanged.

Example 28 may be example 27, wherein the means for dynamically building and providing may comprise means for monitoring and analyzing the messages exchanged between the IoT devices or the messages exchanged between the IoT devices and the enterprise or public network.

Example 29 may be example 28, wherein the means for dynamically building and providing may comprise means for detecting long words in the messages exchanged between the IoT devices or the messages exchanged between the IoT devices and the enterprise or public network, that have word lengths greater than a word length threshold.

Example 30 may be example 29, wherein the means for dynamically building and providing may comprise means for assigning codes to at least some of the long words, and means for adding coding entries into the coding table mapping the at least some of the long words to the assigned codes.

Example 31 may be example 30, wherein the means for dynamically building and providing may comprise means for tracking encountered frequencies of the long words, and the at least some of the long words that get assigned codes are new unique long words without assigned codes with encountered frequencies in excess of a frequency threshold.

Example 32 may be any one of examples 29-31, wherein the means for dynamically building and providing may comprise means for sending the long words to a cloud server to have codes assigned to at least some of the long words, and means for receiving in response from the cloud server, a coding table with coding entries mapping at least some of the long words to assigned codes, or updates to the coding table.

Example 33 may be example 32, wherein the means for dynamically building and providing may comprise means for receiving the messages exchanged between the IoT devices and the enterprise or public network; means for providing the long words to the cloud server; and means for receiving in response from the cloud server, the code table or updates to the code table.

Example 34 may be an apparatus for supporting an Internet-of-Things (IoT) gateway of an IoT network to communicatively couple a plurality of IoT devices of the IoT network to each other, and to an enterprise or public network, comprising: networking circuitry to communicatively couple the apparatus with the IoT gateway of the IoT network, and to receive long words detected in messages exchanged among the IoT devices of the IoT network, or messages exchanged between the IoT devices and other devices of the enterprise or public network, wherein the long words have word lengths in excess of a word length threshold; and code table building circuitry coupled with the networking circuitries to dynamically assign codes to at least some of the long words, and build and provide a code table having coding entries that map the at least some of the long words to the assigned codes to the IoT devices, via the IoT gateway, to use to exchange messages with each other, or with other devices on the enterprise or public network.

Example 35 may be example 34, wherein the code table building circuitry may further track encountered frequencies of the long words, and the at least some of the long words that get assigned codes are new unique long words without assigned codes with encountered frequencies in excess of a frequency threshold.

Example 36 may be example 34 or 35, further comprising a gateway manager coupled with the networking circuitry and the code table building circuitry may receive the long words from the IoT gateway, and to provide to the IoT gateway the code table or updates to the code table.

Example 37 may be a method for supporting an Internet-of-Things (IoT) gateway of an IoT network to communicatively couple a plurality of IoT devices of the IoT network to each other, and to an enterprise or public network, comprising: receiving, by a cloud server, long words detected in messages exchanged among the IoT devices of the IoT network, or messages exchanged between the IoT devices and other devices of the enterprise or public network, wherein the long words have word lengths in excess of a word length threshold; and dynamically assigning codes, by the cloud server, to at least some of the long words, and building and providing, by the cloud server, a code table with coding entries that map the at least some of the long words to the assigned codes to the IoT devices, via the IoT gateway, to use to exchange messages with each other, or with other devices on the enterprise or public network.

Example 38 may be example 37, wherein further comprising tracking encountered frequencies of the long words, and the at least some of the long words that get assigned codes are new unique long words without assigned codes with encountered frequencies in excess of a frequency threshold.

Example 39 may be example 34 or 35, further comprising receiving the long words from the IoT gateway, and providing to the IoT gateway the code table or updates to the code table.

Example 40 may be at least one computer readable media (CRM) comprising a plurality of instructions arranged to cause a cloud server, in response to execution of the instructions by the cloud server, to support an Internet-of-Things (IoT) gateway of an IoT network to communicatively couple a plurality of IoT devices of the IoT network to each other, and to an enterprise or public network, including to: receive long words detected in messages exchanged among the IoT devices, or messages exchanged between the IoT devices and other devices of the enterprise or public network, wherein the long words have word lengths in excess of a word length threshold; and dynamically assign codes to at least some of the long words, and build and provide a code table with coding entries that map the at least some of the long words to the assigned codes to the IoT devices, via the IoT gateway, to use to exchange messages with each other, or with other devices on the enterprise or public network Example 41 may be example 40, wherein the IoT gateway may be further caused to track encountered frequencies of the long words, and the at least some of the long words that get assigned codes are new unique long words without assigned codes with encountered frequencies in excess of a frequency threshold.

Example 42 may be example 40 or 41, wherein the IoT gateway may be further caused to receive the long words from the IoT gateway, and to provide to the IoT gateway the code table or updates to the code table.

Example 41 may be a system for communicatively supporting an Internet-of-Things (IoT) gateway of an IoT network to communicatively couple a plurality of IoT devices of the IoT network to each other, and to an enterprise or public network, comprising: networking circuitry to communicatively couple the apparatus with the IoT gateway, and to receive long words detected in messages exchanged among the IoT devices, or messages exchanged between the IoT devices and other devices of the enterprise or public network, wherein the long words have word lengths in excess of a word length threshold; and means for dynamically assigning codes to at least some of the long words, and building and providing, by the cloud server, a code table with coding entries that map the at least some of the long words to the assigned codes to the IoT devices, via the IoT gateway, to use to exchange messages with each other, or with other devices on the enterprise or public network.

Example 44 may be example 43, wherein means for dynamically assigning codes comprises means for tracking encountered frequencies of the long words, and the at least some of the long words that get assigned codes are new unique long words without assigned codes with encountered frequencies in excess of a frequency threshold.

Example 45 may be example 43 or 44, wherein means for dynamically assigning codes comprises means for receiving the long words from the IoT gateway, and providing to the IoT gateway the code table or updates to the code table.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A gateway apparatus for communicatively coupling a plurality of Internet-of-Things (IoT) devices of an IoT network to each other, and to an enterprise or public network, comprising:
    first networking circuitry to communicatively couple the gateway apparatus with the plurality of the IoT devices of the IoT network;
    second networking circuitry to communicatively couple the gateway apparatus with the enterprise or public network;
    routing circuitry coupled to the first and second networking circuitries to route messages between the IoT devices, and messages between the IoT devices and other devices on the enterprise or public network; and
    code table building circuitry coupled with the first and second networking circuitries to dynamically build and provide a code table having a plurality of codes tailored to the IoT devices for the IoT devices to use to exchange messages with each other, and with the other devices on the enterprise or public network, wherein the code table building circuitry detects and extracts long words with word lengths in excess of a word length threshold from the messages routed, and dynamically build the code table with the plurality of codes tailored for the IoT devices based on the long words detected and extracted from the messages routed;
    wherein on receipt of the code table tailored for the IoT devices, the IoT devices use the plurality of codes of the code table to exchange messages with each other and with the other devices on the enterprise or public network to reduce an amount of bandwidth required to exchange messages with each other and with the other devices on the enterprise or public network.

2. The gateway apparatus of claim 1, wherein to dynamically build and provide the code table, the code table building circuitry is to monitor and analyze the messages exchanged between the IoT devices or the messages exchanged between the IoT devices and the enterprise or public network.

3. The gateway apparatus of claim 1, wherein the code table building circuitry is to further assign codes to at least some of the long words, and add coding entries into the code table mapping the at least some of the long words to the assigned codes.

4. The gateway apparatus of claim 3, wherein the code table building circuitry is to further track encountered frequencies of the long words, and the at least some of the long words that get assigned codes are new unique long words without assigned codes with encountered frequencies in excess of a frequency threshold.

5. The gateway apparatus of claim 1, wherein the code table building circuitry is to send the long words to a cloud server to have codes assigned to at least some of the long words, receive, in response from the cloud server, a code table with coding entries mapping at least some of the long words to assigned codes, or updates to the code table.

6. The gateway apparatus of claim 5, further comprising cloud adapter circuitry coupled to the second networking circuitry and the code table building circuitry to receive the messages exchanged between the IoT devices and the enterprise or public network; to provide the long words to the cloud server; and to receive, in response from the cloud server, the code table or updates to the code table.

7. The gateway apparatus of claim 1, wherein the gateway apparatus is part of the IoT network, and to provide the code table to the IoT devices, the code table building circuitry is to provide the code table, after initial formation of the code table, to an IoT device, when the IoT device first sends or receives a message.

8. The gateway apparatus of claim 1, wherein the code table building circuitry is to further periodically send updates for the code table to the IoT devices.

9. The gateway apparatus of claim 8, further comprising agent manager circuitry coupled to the first networking circuitry and the code table building circuitry to receive the messages exchanged between the IoT devices or messages exchanged between the IoT devices and the enterprise or public network; or to provide the code table and updates to the code table to the IoT devices.

10. The gateway apparatus of claim 1, further comprising third party coding and decoding circuitries coupled with the first and second networking circuitries to code and decode messages exchanged between the IoT devices and some of the devices of the enterprise or public network, on behalf of the some of the devices of the enterprise or public network.

11. A method for facilitating sending and receiving messages by Internet-of-Things (IoT) devices, comprising:
    receiving and routing, by an IoT gateway, messages exchanged among a plurality of IoT devices of an IoT network, or messages exchanged between the IoT devices and other devices of an enterprise or public network; and
    dynamically building and providing a code table having a plurality of codes tailored for the IoT devices to the IoT devices to use to exchange messages with each other, or with the other devices on the enterprise or public network, the code table being dynamically built based at least in part on words in the messages exchanged;
    wherein dynamically building and providing comprises detecting and extracting long words with word lengths in excess of a word length threshold from the messages routed, and dynamically building the code table with the plurality of codes tailored for the IoT devices based on the long words detected and extracted from the messages routed;
    wherein on receipt of the code table tailored for the IoT devices, the IoT devices use the plurality of codes of the code table to exchange messages with each other and with the other devices on the enterprise or public network to reduce an amount of bandwidth required to exchange messages with each other and with the other devices on the enterprise or public network.

12. The method of claim 11, further comprising monitoring and analyzing the messages exchanged between the IoT devices or the messages exchanged between the IoT devices and the enterprise or public network.

13. The method of claim 11, further comprising assigning codes to at least some of the long words, and adding coding entries into the code table mapping the at least some of the long words to the assigned codes; and tracking encountered frequencies of the long words, and the at least some of the long words that get assigned codes are new unique long words without assigned codes with encountered frequencies in excess of a frequency threshold.

14. At least one non-transitory computer readable media (CRM) comprising a plurality of instructions arranged to cause an Internet-of-Things (IoT) gateway, in response to execution of the instructions by the IoT gateway, to:
receive and route messages exchanged among a plurality of IoT devices of an IoT network, or messages exchanged between the IoT devices and other devices of an enterprise or public network; and
dynamically build and provide a code table having a plurality of codes tailored for the IoT devices to the IoT devices to use to exchange messages with each other, or with the other devices on the enterprise or public network, the code table being dynamically built based at least in part on words in the messages exchanged,
wherein to dynamically build and provide comprises to detect and extract long words with word lengths in excess of a word length threshold from the messages routed, and dynamically build the code table with the plurality of codes tailored for the IoT devices based on the long words detected and extracted from the messages routed;
wherein on receipt of the code table tailored for the IoT devices, the IoT devices use the plurality of codes of the code table to exchange messages with each other and with the other devices on the enterprise or public network to reduce an amount of bandwidth required to exchange messages with each other and with the other devices on the enterprise or public network.

15. The non-transitory CRM of claim 14, wherein the IoT gateway is further caused to monitor and analyze the messages exchanged between the IoT devices or the messages exchanged between the IoT devices and the enterprise or public network.

16. The non-transitory CRM of claim 14, wherein the IoT gateway is further caused to assign codes to at least some of the long words, and add coding entries into the code table mapping the at least some of the long words to the assigned codes.

17. The non-transitory CRM of claim 16, wherein the IoT gateway is further caused to track encountered frequencies of the long words, and the at least some of the long words that get assigned codes are new unique long words without assigned codes with encountered frequencies in excess of a frequency threshold.

18. The non-transitory CRM of claim 14, wherein the IoT gateway is further caused to send the long words to a cloud server to have codes assigned to at least some of the long words, receiving, in response from the cloud server, a code table with coding entries mapping at least some of the long words to assigned codes, or updates to the code table.

19. The non-transitory CRM of claim 18, wherein the IoT gateway is further caused to receive the messages exchanged between the IoT devices and the enterprise or public network; provide the long words to the cloud server; and receive, in response from the cloud server, the code table or updates to the code table.

20. A server apparatus for supporting an Internet-of-Things (IoT) gateway of an IoT network to communicatively couple a plurality of IoT devices of the IoT network to each other, and to an enterprise or public network, comprising:
networking circuitry to communicatively couple the server apparatus with the IoT gateway of the IoT network, and to receive long words detected and extracted by the IoT gateway in messages exchanged among the IoT devices of the IoT network, or messages exchanged between the IoT devices and other devices of the enterprise or public network through the IoT gateway, wherein the long words have word lengths in excess of a word length threshold; and
code table building circuitry coupled with the networking circuity to dynamically assign codes to at least some of the long words, and build and provide a code table having coding entries tailored for the IoT devices that map the at least some of the long words to the assigned codes to the IoT devices, via the IoT gateway, to use to exchange messages with each other, or with other devices on the enterprise or public network;
wherein on receipt of the code table tailored for the IoT devices, via the IoT gateway, the IoT devices use the codes of the code table to exchange messages with each other and with the other devices on the enterprise or public network to reduce an amount of bandwidth required to exchange messages with each other and with the other devices on the enterprise or public network.

21. The apparatus of claim 20, wherein the code table building circuitry is to further track encountered frequencies of the long words, and the at least some of the long words that get assigned codes are new unique long words without assigned codes with encountered frequencies in excess of a frequency threshold.

22. The apparatus of claim 20, further comprising a gateway manager coupled with the networking circuitry and the code table building circuitry is to receive the long words from the IoT gateway, and to provide to the IoT gateway the code table or updates to the code table.

* * * * *